(12) United States Patent
Dhana et al.

(10) Patent No.: US 11,748,795 B2
(45) Date of Patent: Sep. 5, 2023

(54) SYSTEM AND A METHOD FOR PROVIDING AN OPTIMIZED ONLINE GARMENT CREATION PLATFORM

(71) Applicant: Dhana Inc., Sausalito, CA (US)

(72) Inventors: Indra Shamini Dhana, Mill Valley, CA (US); Geelapaturu Subrahmanya Venkata Radha Krishna Rao, Chennai (IN); Dinesh Reddy Vemula, Mahabubabad District (IN)

(73) Assignee: Dhana Inc., Sausalito, CA (US)

( * ) Notice: Subject to any disclaimer, the term of this patent is extended or adjusted under 35 U.S.C. 154(b) by 238 days.

(21) Appl. No.: 17/198,725

(22) Filed: Mar. 11, 2021

(65) Prior Publication Data

US 2022/0292562 A1 Sep. 15, 2022

(51) Int. Cl.
*G06Q 30/00* (2023.01)
*G06Q 30/0601* (2023.01)
*G06Q 10/087* (2023.01)
*G06T 15/20* (2011.01)
(Continued)

(52) U.S. Cl.
CPC ....... *G06Q 30/0621* (2013.01); *G06F 3/0486* (2013.01); *G06F 16/51* (2019.01); *G06Q 10/087* (2013.01); *G06Q 30/0631* (2013.01); *G06Q 30/0643* (2013.01); *G06T 5/002* (2013.01); *G06T 7/579* (2017.01); *G06T 7/70* (2017.01); *G06T 15/205* (2013.01); *G06T 19/20* (2013.01); *G06T 2210/16* (2013.01);
(Continued)

(58) Field of Classification Search
CPC ........... G06Q 30/0621; G06Q 30/0631; G06Q 30/0643; G06Q 10/087; G06T 7/579; G06T 5/002; G06T 15/205; G06T 19/20; G06F 16/51; G06F 3/0486
See application file for complete search history.

(56) References Cited

U.S. PATENT DOCUMENTS 6,882,897 B1  4/2005  Fernandez
6,907,310 B2  6/2005  Gardner et al.
(Continued)

FOREIGN PATENT DOCUMENTS

IN   1862/MUM/2015   11/2016
KR   20170068741 A   6/2017

OTHER PUBLICATIONS

International Search Report and Written Opinion issued in Appln. No PCT/US2022/019725 dated Jun. 21, 2022 (18 pages).

*Primary Examiner* — Ethan D Civan
(74) *Attorney, Agent, or Firm* — Lerner David LLP

(57) ABSTRACT

A system and method for generating an optimized online garment creation platform is provided. Multiple fabric pieces data are rendered via a user interface (UI) on user device. Fabric pieces data are tagged on UI based on a circulatory score. Size of garment type is tagged on UI using tagged fabric piece data for designing a garment via UI. Garment types are rendered in template form on UI. The garment type templates are tagged on UI. Tagged garment type template is split into fixed number of panels. Images in panels of garment type template are optimally embedded. A pixel per distance metric of edited region of the image is computed for determining size of edited region of image. Edited region of image is added as a swatch in the garment type template. The panels of the garment type template are tagged for embedding with edited images.

49 Claims, 12 Drawing Sheets

(51) Int. Cl.
*G06T 19/20* (2011.01)
*G06T 7/70* (2017.01)
*G06T 7/579* (2017.01)
*G06T 5/00* (2006.01)
*G06F 16/51* (2019.01)
*G06F 3/0486* (2013.01)

(52) U.S. Cl.
CPC ...... *G06T 2210/22* (2013.01); *G06T 2215/16* (2013.01); *G06T 2219/2016* (2013.01); *G06T 2219/2021* (2013.01); *G06T 2219/2024* (2013.01)

(56) References Cited

U.S. PATENT DOCUMENTS

| | | |
|---|---|---|
| 7,525,687 B2 | 4/2009 | Silverbrook |
| 7,657,341 B2 | 2/2010 | Lind |
| 8,525,828 B1 | 9/2013 | Bates |
| 8,941,642 B2 | 1/2015 | Tadaishi et al. |
| 10,546,433 B2 | 1/2020 | Lin et al. |
| 2011/0025694 A1 | 2/2011 | Ptucha et al. |
| 2011/0029914 A1 | 2/2011 | Whitby et al. |
| 2011/0298897 A1 | 12/2011 | Sareen et al. |
| 2013/0066750 A1 | 3/2013 | Siddique et al. |
| 2014/0277663 A1 | 9/2014 | Gupta et al. |
| 2015/0134302 A1 | 5/2015 | Chhugani et al. |
| 2016/0227854 A1 | 8/2016 | Ellis |
| 2017/0004567 A1 | 1/2017 | Dutt et al. |
| 2019/0264380 A1* | 8/2019 | Sights ................... D06C 23/02 |
| 2020/0364533 A1* | 11/2020 | Sareen ................... G06T 19/00 |
| 2022/0067610 A1* | 3/2022 | Aggarwal ............ G06Q 10/087 |

* cited by examiner

SYSTEM AND A METHOD FOR PROVIDING AN OPTIMIZED ONLINE GARMENT CREATION PLATFORM

FIELD OF THE INVENTION

The present invention relates generally to the field of online garment creation. More particularly, the present invention relates to a system and a method for generating an optimized online garment creation platform.

BACKGROUND OF THE INVENTION

Digitization of fashion and apparel industry is increasing rapidly with the growth and popularity of online garment designing platforms. Existing online garment designing platforms are associated with inefficiencies such as limited techniques for creating garment designs and limited garment construction options to users. In particular, it has been observed that existing online garment designing platforms do not effectively cater to requirements for assembly, construction and designing of garments. Further, existing online garment designing platforms are not robust and are not capable of effectively capturing user inputs (such as, garment material selection, design selection, etc.) in garment designing. Further, the existing online garment designing platforms are not flexible in order to provide personalized garment designing experience to the user and do not support extending life of the garments. Furthermore, the existing online garment designing platforms do not take into consideration environmental impact (e.g. carbon emissions, water, energy, use of toxic chemicals) and social impact (e.g. certifications and standards) of garment designing.

In light of the above drawbacks, there is a need for a system and a method which provides for generating an optimized online garment creation platform. There is a need for a system and a method which provides for an online garment creation platform for optimized assembly, construction and designing of garments. Furthermore, there is a need for a system and a method which provides for an online garment creation platform that takes into consideration environmental and social impact of online garment creation.

SUMMARY OF THE INVENTION

In various embodiment of the present invention, a system for generating an optimized online garment creation platform is provided. The system comprises a memory storing program instructions, a processor executing the program instructions stored in the memory and a garment creation engine executed by the processor. The garment creation engine configured to render multiple fabric pieces data via a user interface (UI) on a user device. Further, the garment creation engine configured to tag the one or more fabric pieces data on the UI based on a circulatory score. The circulatory score is indicative of environmental impact of the fabric pieces data. Further, the garment creation engine configured to tag a size of a garment type on the UI using the tagged fabric piece data for designing a garment via the UI. Further, the garment creation engine configured to render one or more garment types in a template form on the UI. The one or more garment type templates are tagged on the UI. Further, the garment creation engine configured to split the tagged garment type template into a fixed number of one or more panels. The dimensions and layout of the panels vary based on the tagged garment type template. Further, the garment creation engine configured to optimally embed images in the one or more panels of the garment type template. A pixel per distance metric of an edited region of the image is computed for determining size of the edited region of the image. Further, the garment creation engine configured to add the edited region of image as a swatch in the garment type template. The swatches which fit the edited region of the image for a specific angle of rotation of the edited region of the image are computed in the garment type template. Lastly, the garment creation engine configured to tag the one or more panels of the garment type template for embedding with the one or more edited images.

In various embodiments of the present invention, a method for generating an optimized online garment creation platform is provided. The method is implemented by a processor executing program instructions stored in a memory. The method comprises rendering multiple fabric pieces data via a user interface (UI) on a user device. Further, tagging the one or more fabric pieces data on the UI based on a circulatory score. The circulatory score is indicative of environmental impact of the fabric pieces data. Further, tagging a size of a garment type on the UI using the tagged fabric piece data for designing a garment via the UI. Further, rendering one or more garment types in a template form on the UI. The one or more garment type templates are tagged on the UI. Further, splitting the tagged garment type template into a fixed number of one or more panels. Dimensions and layout of the panels vary based on the tagged garment type template. Further, optimally embedding images in the one or more panels of the garment type template. A pixel per distance metric of an edited region of the image is computed for determining size of the edited region of the image. Further, adding the edited region of image as a swatch in the garment type template. The swatches which fits the edited region of the image for a specific angle of rotation of the edited region of the image are computed in the garment type template. Lastly, tagging the one or more panels of the garment type template for embedding with the one or more edited images.

In various embodiments of the present invention, a computer program product is provided. The computer program product comprising a non-transitory computer-readable medium having computer program code stored thereon, the computer-readable program code comprising instructions that, when executed by a processor, causes the processor to render multiple fabric pieces data via a user interface (UI) on a user device. Further, tag the one or more fabric pieces data on the UI based on a circulatory score. The circulatory score is indicative of environmental impact of the fabric pieces data. Further, tag a size of a garment type on the UI using the tagged fabric piece data for designing a garment via the UI. Further, render one or more garment types in a template form on the UI. The one or more garment type templates are tagged on the UI. Further, split the tagged garment type template into a fixed number of one or more panels. Dimensions and layout of the panels vary based on the tagged garment type template. Further, optimally embed images in the one or more panels of the garment type template. A pixel per distance metric of an edited region of the image is computed for determining size of the edited region of the image. Further, add the edited region of image as a swatch in the garment type template. The swatches which fits the edited region of the image for a specific angle of rotation of the edited region of the image are computed in the garment type template. Lastly, tag the one or more panels of the garment type template for embedding with the one or more edited images.

BRIEF DESCRIPTION OF THE ACCOMPANYING DRAWINGS

The present invention is described by way of embodiments illustrated in the accompanying drawings wherein:

FIG. 1 is a detailed block diagram of a system for generating an optimized online garment creation platform, in accordance with an embodiment of the present invention;

FIGS. 2A and 2B together collectively depict a screenshot of a user interface (UI) illustrating splitting of a garment type template into a fixed number of one or more panels, in accordance with an embodiment of the present invention;

FIGS. 3A, 3B, and 3C together collectively depict a screenshot of a user interface (UI) illustrating embedding of memory images in selected panels, in accordance with an embodiment of the present invention;

DETAILED DESCRIPTION OF THE INVENTION

The present invention discloses a system and a method for generating an optimized online garment creation platform. In particular, the present invention provides for generating an optimized online garment creation and designing platform via an actionable user interface (UI). The present invention provides for a system and a method for providing multiple garment customization options for online garment creation and designing. Further, the present invention provides for a system and a method for effectively catering to requirements for online assembly, construction and designing of garments. Further, the present invention provides for a system and a method for robust online garment creation and designing that is capable of effectively capturing and integrating user inputs for garment designing. Furthermore, the present invention provides for a system and a method for a personalized online garment creation and designing experience to users by effectively processing inputs of users. Yet further, the present invention provides for a system and a method which takes into consideration environmental impact and social impact of online garment creation and designing and also by taking back the old garments, renting the garments, reselling and recycling the garments.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
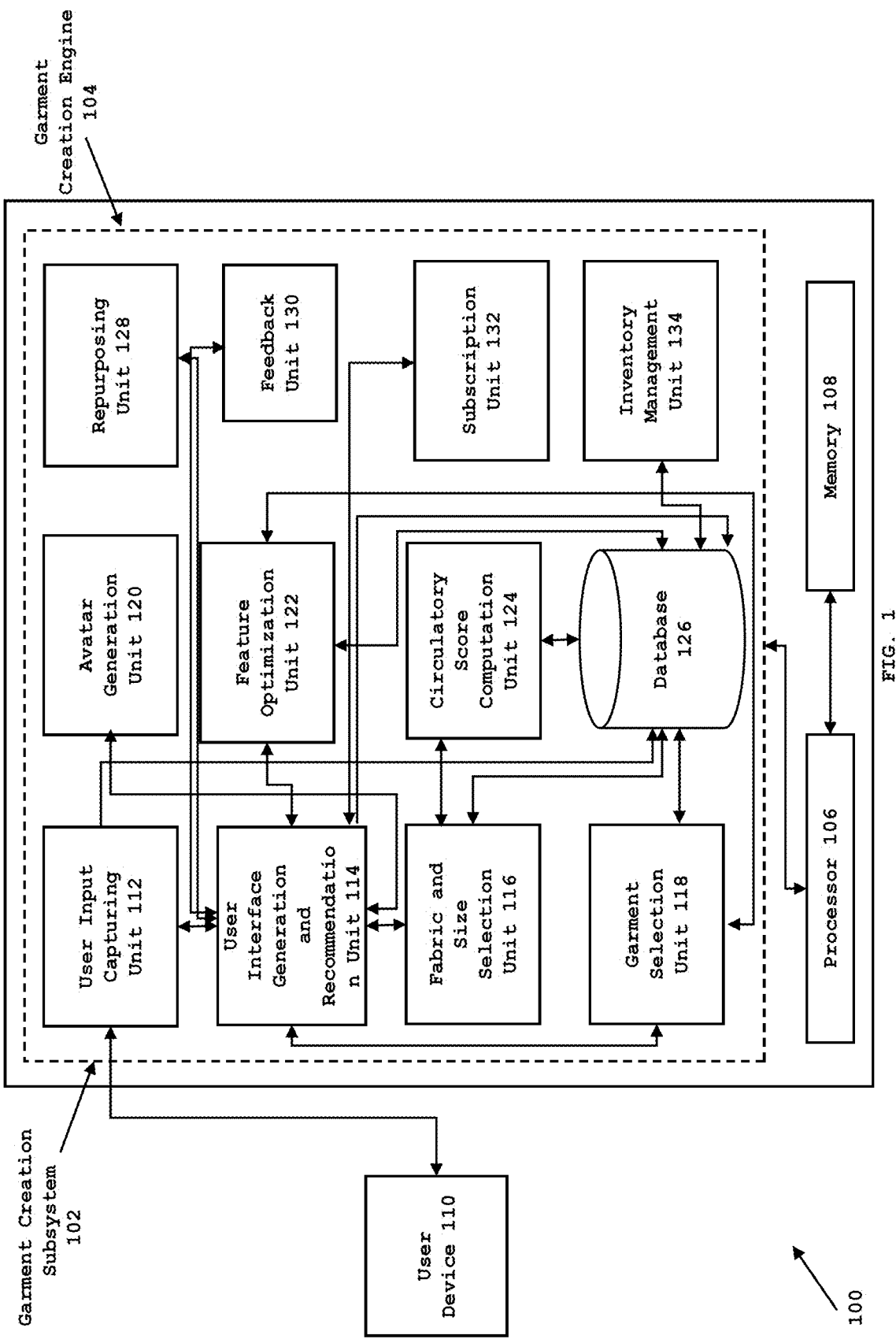

FIG. 1 is a detailed block diagram of a system 100 for generating an optimized online garment creation platform, in accordance with an embodiment of the present invention. Referring to FIG. 1, the system 100 comprises a user device 110 and a garment creation subsystem 102. The user device 110 is connected to the garment creation subsystem 102 via a communication network (not shown). The communication network (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a Local Area Network (LAN), a Metropolitan Area Network (MAN) and a Wide Area Network (WAN).

In an embodiment of the present invention, the subsystem 102 is a platform which may be implemented in a cloud computing architecture in which data, applications, services, and other resources are stored and delivered through shared data-centers. In an exemplary embodiment of the present invention, the functionalities of the subsystem 102 are delivered to a user as Software as a Service (SaaS) or a Platform as a Service (PaaS) over the communication network (not shown).

In another embodiment of the present invention, the subsystem 102 is a platform which may be implemented as a client-server architecture. In this embodiment, a client terminal accesses a server hosting the subsystem 102 over a communication network. The client terminals may include but are not limited to a smart phone, a computer, a tablet, a Graphical User Interface (GUI), an Application Programming Interface (API), microcomputer or any other wired or wireless terminal. The server may be a centralized or a decentralized server.

In an embodiment of the present invention, the subsystem 102 is configured to provide an online garment creation user interface (UI) via the user device 110 to a user. The UI is an actionable UI configured to capture various inputs from users for online garment creation and render various features for garment creation and designing on the user device 110. The user may include, but is not limited to, a consumer, a designer or anyone interested in creating and designing garments. In an embodiment of the present invention, the subsystem 102 is an intelligent self-optimization platform configured to employ cognitive techniques for optimizing garment designing, creation and visualization via the UI on the user device 110. The cognitive techniques may include, but are not limited to, machine learning techniques and deep learning techniques. In an exemplary embodiment of the present invention, the subsystem 102 is configured to operate based on an on-demand system approach such that the various functionalities of the subsystem 102 are provided to user at any point of time.

In an embodiment of the present invention, the subsystem 102 comprises a garment creation engine 104, a processor 106 and a memory 108. The garment creation engine 104 (the engine 104) includes various units which operate in conjunction with each other for providing optimized online garment creation. The various units of the engine 104 are operated via the processor 106 specifically programmed to execute instructions stored in the memory 108 for executing respective functionality of the units of the engine 104, in accordance with various embodiments of the present invention.

In an embodiment of the present invention, the engine 104 comprises a user input capturing unit 112, a user interface generation and recommendation unit 114, a fabric and size selection unit 116, a garment selection unit 118, an avatar generation unit 120, a feature optimization unit 122, a circulatory score computation unit 124, a database 126, repurposing unit 128, a feedback unit 130, a subscription unit 132 and an inventory management unit 134.

In an embodiment of the present invention, the user input capturing unit 112 is configured to receive one or more inputs via the user device 110 for garment creation and designing via the actionable User Interface (UI). The actionable UI is generated by the user interface generation and recommendation unit 114 of the engine 104 and rendered on the user device 110. In an exemplary embodiment of the present invention, the actionable UI renders a dashboard on the user device 110 comprising one or more options associated with garment creation and designing for receiving inputs. The one or more options associated with garment creation and designing may include, but are not limited to, size selection option, color selection option, base pattern selection option, thread selection option, type of fabric selection option and collaboration option with other users for designing of the garments. Further, the user device 110 may include, but is not limited to, a laptop, a computer, a digital electronic device, a tablet and a smart phone. Users may access the UI for garment designing via the user device 110 using a unique ID associated with the users. The user input capturing unit 112 is configured to analyze the received inputs for determining requirements for garment creation and designing associated with the received inputs. The user input capturing unit 112 transmits the analyzed inputs in the form of a first set of instructions to the user interface generation and recommendation unit 114. Based on the received first set of instructions, the user interface generation and recommendation unit 114 is configured to fetch and render multiple fabric pieces data in a graphical format via the UI on the user device 110. The multiple fabric pieces data are catalogued in the database 126 in a graphical file format for storage and are fetched for rendering on the UI. The multiple fabric pieces data stored in the database 126 is associated with fabric use data, fabric pattern data, fabric styles data, fabric default fitting data and type of fabric piece data.

In an embodiment of the present invention, the user interface generation and recommendation unit 114 is configured to trigger the fabric and size selection unit 116 after receiving the first set of instructions. Subsequently, the fabric and size selection unit 116 transmits a second set of instructions to the database 126 for fetching the stored multiple fabric pieces data in the graphical file format based on the received inputs, which are thereafter rendered via the UI on the user device 110 by the user interface generation and recommendation unit 114. In another embodiment of the present invention, the multiple fabric pieces data stored in the database 126 may include photographs uploaded by the user via the UI on the user device 110. The photographs are uploaded in a pre-defined format and correspond to one or more fabric pieces available at the user device 110. The user input capturing unit 112 of the engine 104 is configured to analyze the photographs and transmit the analyzed inputs (i.e. fabric pieces data corresponding to the photographs) to the database 126 for storage. The photographs of the fabric pieces data are stored in the database 126 in a graphical file format. Further, the stored photographs of the fabric pieces data are also rendered on the UI along with other pre-stored fabric pieces data based on the received inputs. In an embodiment of the present invention, the user interface generation and recommendation unit 114 and the fabric and size selection unit 116 may communicate with a third party entity (not shown) for rendering fabric pieces data via the UI in addition to the fabric pieces data stored in the database 126. In an embodiment of the present invention, the database 126 is updated in a pre-defined time interval based on new design, style and pattern of fabric pieces data which are further processed for future retrieval.

In an exemplary embodiment of the present invention, the fabric pieces data stored in the database 126 may include, but are not limited to, pure cotton, blended cotton, silk, wool, nylon, lyocell, natural fabrics (e.g. fabric pieces made from pineapple waste, cork, plastic, citrus, etc.), salvaged fabric (e.g. fabric pieces made from plane seats, sail boats, cushions, curtains, etc.), overstock fabrics (e.g. fabrics procured from different trademarks (vintage and current)) and deadstock fabrics (e.g. fabrics procured from warehouses). Further, the fabric pieces may be of different colors such as, but are not limited to, violet, indigo, red, blue, yellow, orange, burgundy, green, pink, white, brown grey, black, silver, golden, magenta, dandelion, cerulean, apricot, scarlet, cyan, etc. and a combination thereof. In an embodiment of the present invention, each of the fabric pieces data stored in the database 126 is associated with a metadata. The metadata associated with the fabric pieces data includes one or more parameters such as, but are not limited to, data related to the material of the fabric piece, reusability of the fabric piece, environmental impact of the fabric piece, recycling efficiency of the fabric piece and life extension of the fabric piece.

In an embodiment of the present invention, different types of fabric pieces data may be selected via the UI rendered on the user device 110 for creating and designing multiple personalized garment types in a graphical format. In various exemplary embodiments of the present invention, the garments may be created and designed for men, women and kids comprising, but not limited to, shirts, t-shirts, trousers, jeans, chinos, shorts, gowns, jackets, coats, skirts, tops, scarfs, nightwear, underwear, traditional wear (e.g. kurta, saree etc.), formal wear, party wear, etc. of different sizes (e.g. extra-small, small, medium, large, extra-large, etc.) and designs. Further, accessories, home furnishing, bags, blankets, quilts may also be created and designed. The garment types are pre-stored in the database 126 in the form of one or more templates and the templates are fetched and rendered on the UI based on the received input.

In an embodiment of the present invention, in operation, the fabric and size selection unit 116 is configured to tag the one or more fabric pieces data on the UI for garment creation and designing based on a computed circulatory score associated with the fabric pieces metadata. The circulatory score is displayed on the UI along with each fabric piece data. In an embodiment of the present invention, the fabric and size selection unit 116 invokes the circulatory score computation unit 124, which communicates with the database 126 for computing circulatory score for each stored fabric piece metadata associated with the fabric pieces data. The circulatory score is computed separately for each of the parameters associated with the fabric piece metadata, such as, the material of the fabric piece, reusability of the fabric piece, environmental impact of the fabric piece, recycling efficiency of the fabric piece and life extension of the fabric piece. The circulatory score computation unit 124, subsequent to computation of the separate circulatory score for each parameter is configured to compute a cumulative circulatory score for each of the fabric piece parameters associated with the fabric piece metadata. In an exemplary embodiment of the present invention, the circulatory score is in the range of between 0-100, such that, higher the circulatory score more suitable is the fabric piece. Advantageously, the computed circulatory score aids in selecting environmentally benign fabric pieces. Further, the circulatory score provides total impact of the fabric piece on environment for new garment designing, by considering threads, colors used in the fabric piece, life extension of the fabric piece, packaging of the fabric piece, transportation of the fabric piece, energy and workers used in manufacturing of the fabric piece, etc.

In an embodiment of the present invention, subsequent to fabric piece data tagging, the fabric and size selection unit 116 is configured to tag a size of a garment type for creation and designing on the UI using the tagged fabric piece data. The fabric and size selection unit 116 is configured to provide various size options on the UI based on received inputs for tagging the size of the garment type. The size options rendered on the UI may be in one or more measurement standards such as, centimetres (cm) and inches depending upon the metric system followed in the country from which the user is accessing the UI for garment creation and designing.

In an embodiment of the present invention, subsequent to tagging the size of the garment type by the fabric and size selection unit 116, the garment selection unit 118 of the engine 104 is invoked to communicate with the database 126 for fetching and rendering various garment types in a template form on the UI via the user interface generation and recommendation unit 114. The garment type template is representative of the garment which the user intends to create and design such as, but is not limited to, a shirt, a jeans, a trouser, a skirt, etc. In an embodiment of the present invention, the garment selection unit 118 is configured to tag the garment type template for garment creation and designing on the UI based on a selection made by the user via the UI. In an embodiment of the present invention, the garment selection unit 118 is further configured to split the measurement of the garment type template into one or more components based on the size of the garment type tagged by the fabric and size selection unit 116, before rendering on the UI. For example, if the garment type template is of a jacket, then the components of the jacket may include, but are not limited to, jacket flat, hood, pocket and sleeves. In an embodiment of the present invention, the garment selection unit 118 is configured to automatically compute fabric piece requirement for garment creation and designing in subsequent stages of garment creation and designing based on the size tagged by the fabric and size selection unit 116 on the UI.

In an embodiment of the present invention, the garment selection unit 118 is further configured to render one or more designs for selection on the UI for creating and designing the garment type. The designs relate to various garment type templates and stored in the database 126. Based on the selected design, one or more design elements such as, but are not limited to, color, pattern and style are selected via the UI for the selected garment type template. The design and the design elements are pre-stored in the database 126 which are retrieved and fetched by the garment selection unit 118 for rendering on the UI. The garment selection unit 118 is configured to display images of the selected design on the UI. In another embodiment of the present invention, the garment selection unit 118 is configured to automatically generate one or more virtual designs for the garment type template by randomly fetching images from the database 126 and overlaying the fetched images on the garment type template.

Figure 2A:
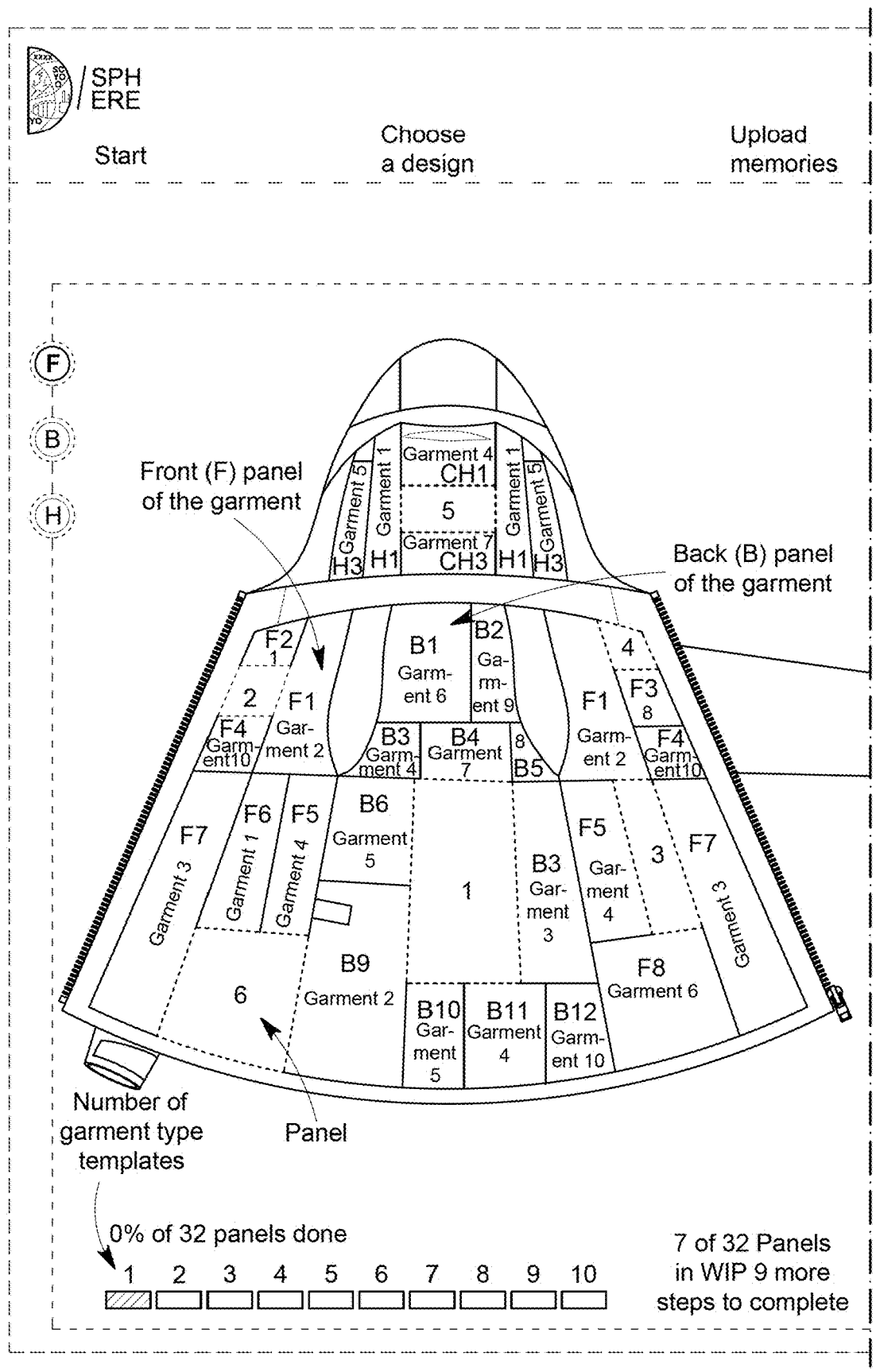
Figure 2B:
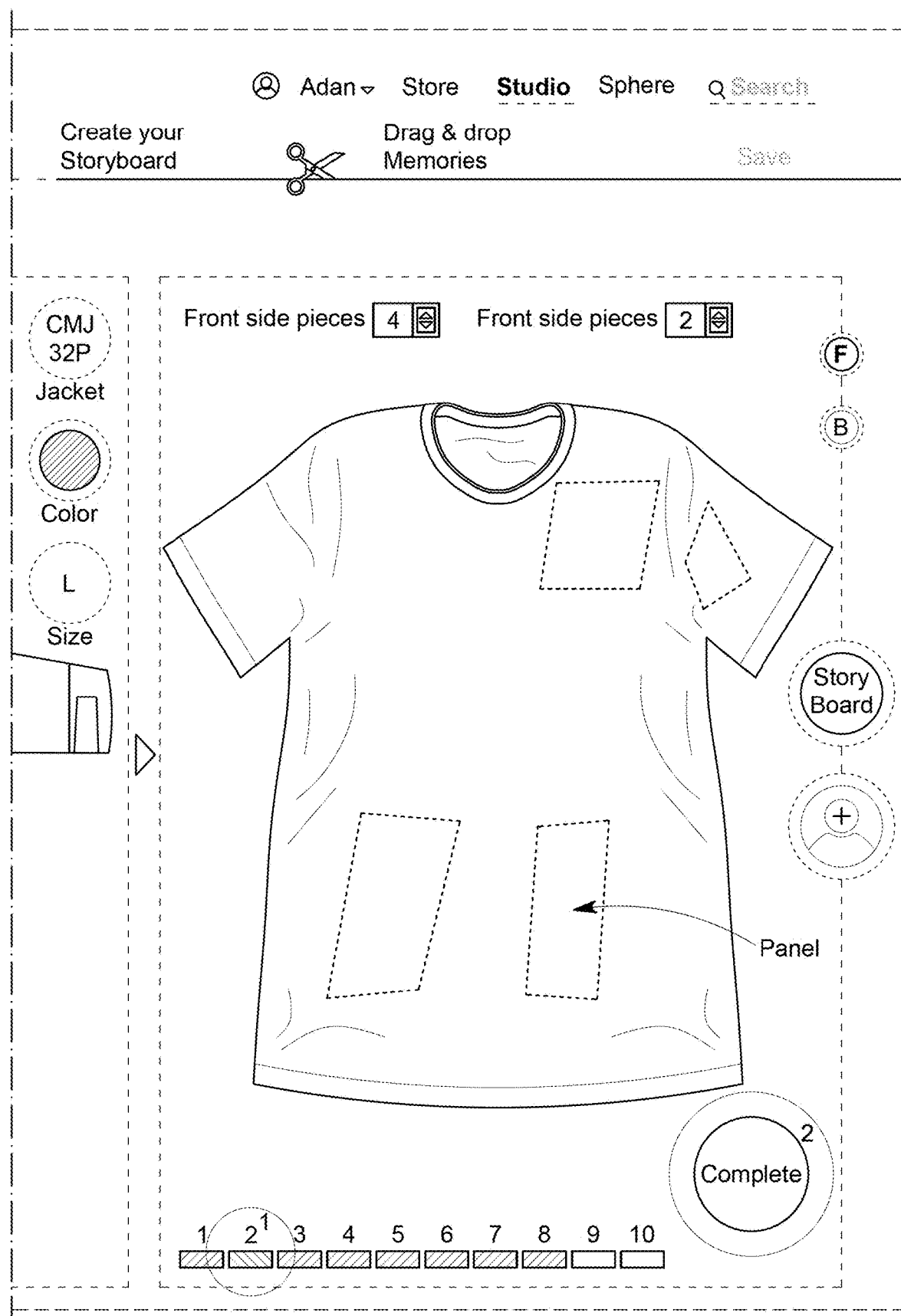

In an embodiment of the present invention, after the design is selected via the UI, the garment selection unit 118 is configured to split the tagged garment type template into a fixed number of one or more panels, as illustrated in FIGS. 2A and 2B. In an exemplary embodiment of the present invention, as illustrated in FIGS. 2A and 2B, the garment type template comprises 32 panels and further 10 garment type templates are provided for splitting into panels. Further, the number of panels may be different for each garment type template based on the user requirements. The panels are selected at least on a front (F) portion of the garment type template and on a back (B) portion of the garment type template. Further, the dimensions and layout of the panels varies based on the tagged garment type template which is determined by the garment selection unit 118. The size of the panels is at least increased and decreased based on the user requirements and the panels may be small or large in size. In an embodiment of the present invention, the garment selection unit 118 is configured to determine panel parameters information such as, but is not limited to, size, shape and placement of panels based on the inputs received via the UI and further the determined panel parameters information is transmitted to the database 126 for storage and future retrieval. Advantageously, the panels enable adding variety of color, and print on the garment type template and customization of the garment type template.

Figure 3A:
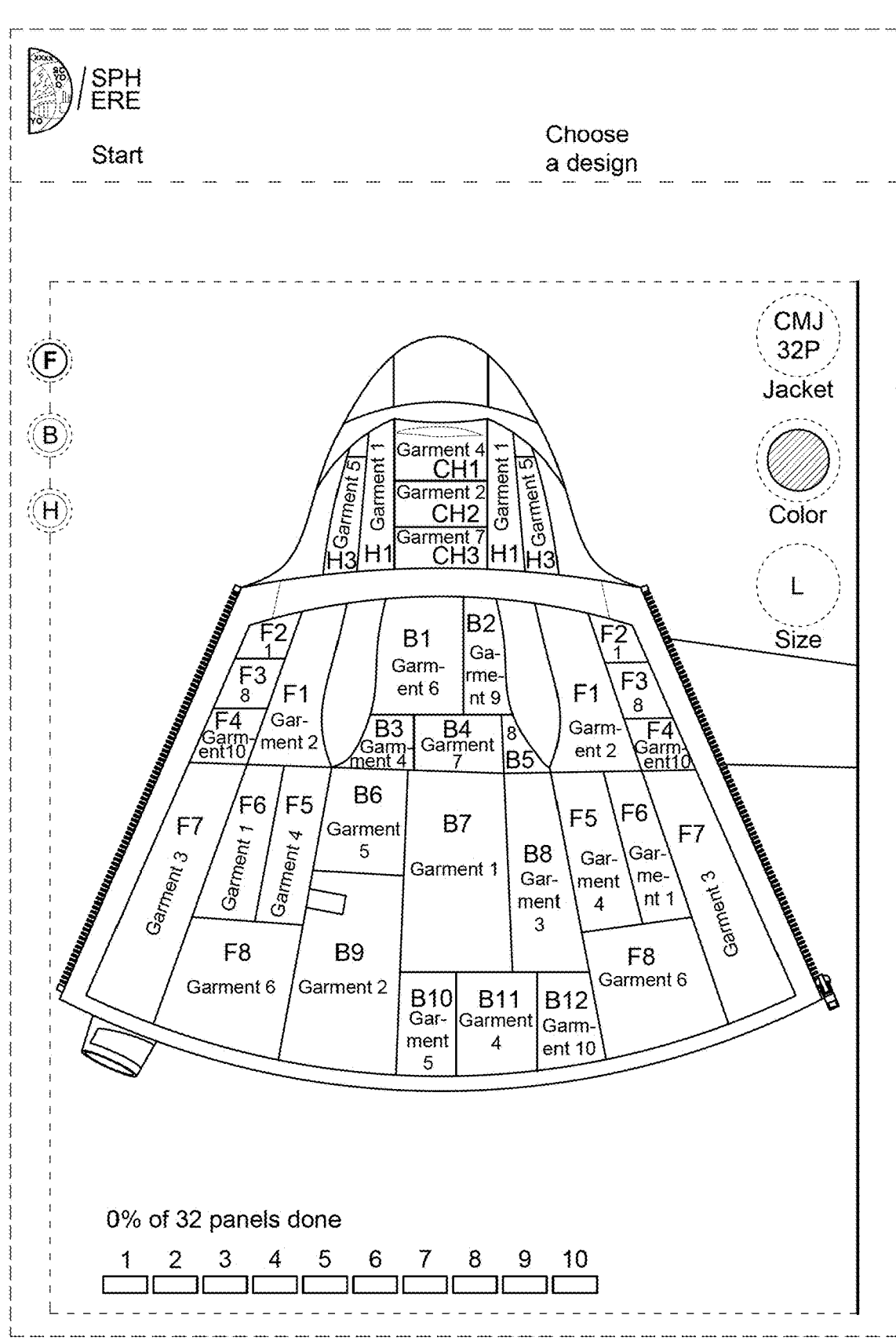
Figure 3B:
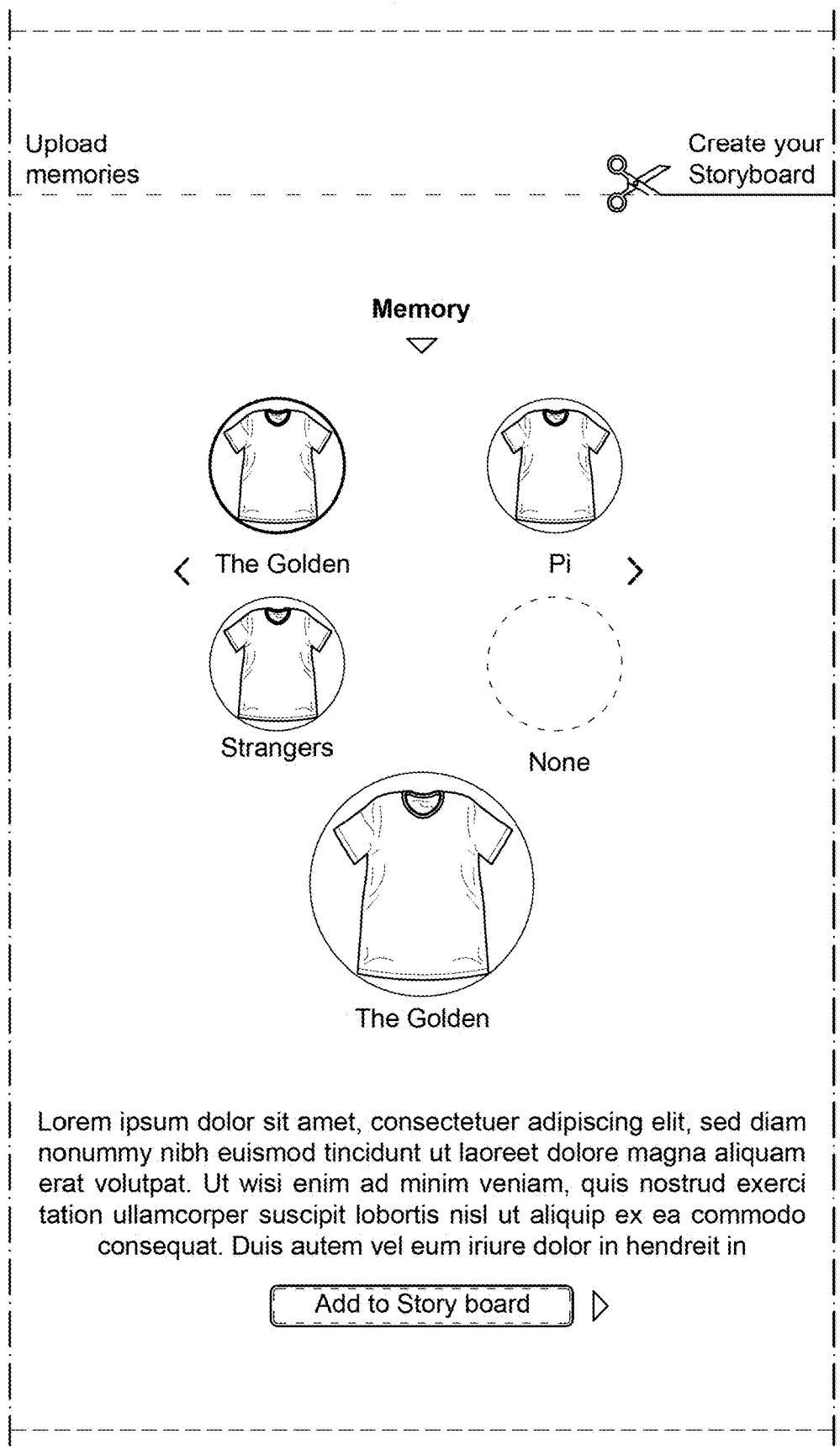
Figure 3C:
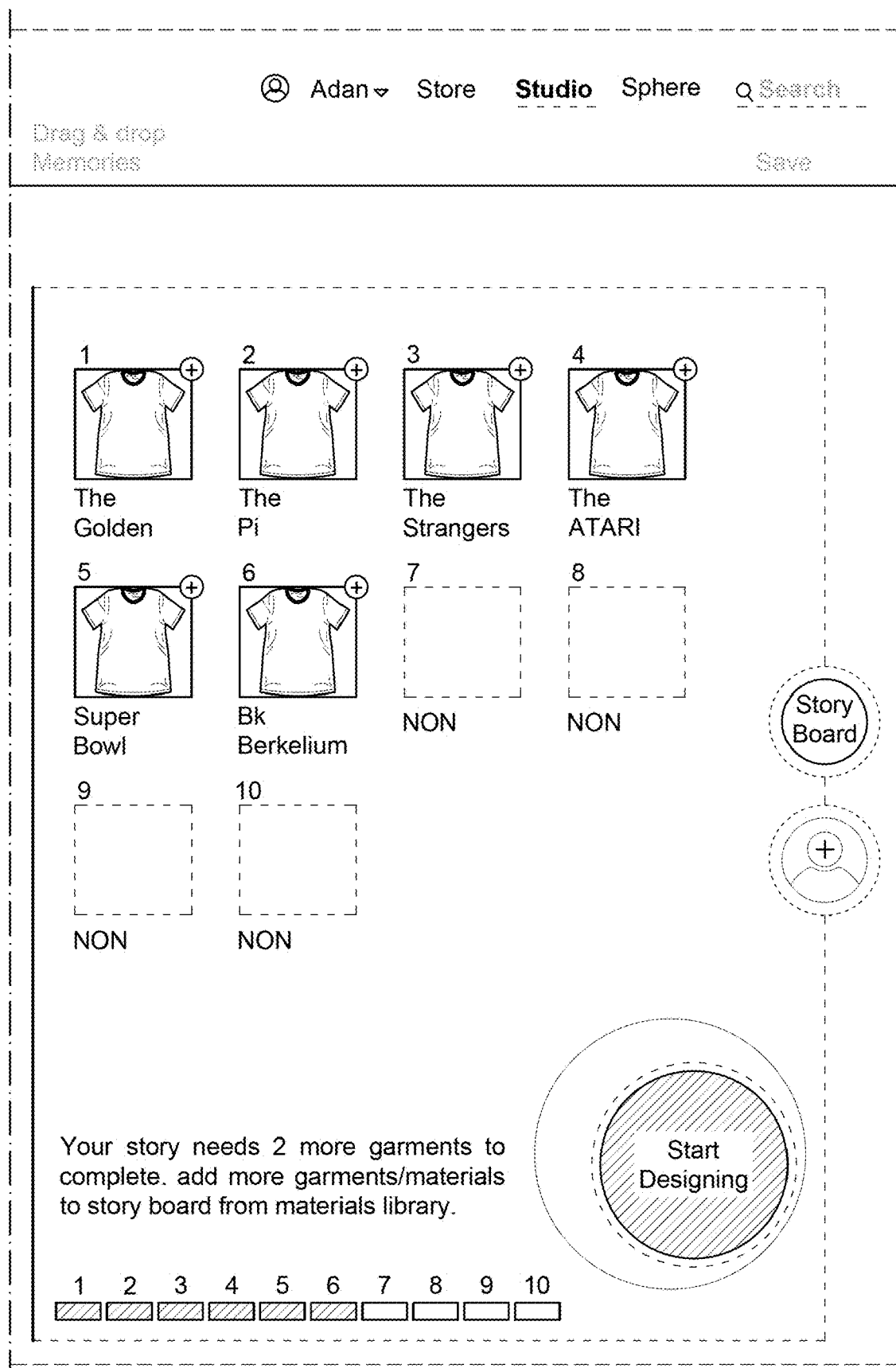

In an embodiment of the present invention, the panels are configurable for being embedded with images as logos. The garment selection unit 118 is configured to upload images via the UI. The images relate to apparels and memories of the users (as illustrated in FIGS. 3A, 3B, and 3C). Further, the garment selection unit 118 is configured to enable editing and modification of the uploaded images for embedding and sewing the uploaded images on to the panel of the garment type template as the logo. In an exemplary embodiment of the present invention, the images of the memories may relate to, but are not limited to, an image of happy moment in the user's life, an image of user's interest, an image of an event and an image of a monument. The images on the UI may be uploaded by at least accessing an image library in the user device 110 and from a social media website. In an embodiment of the present invention, the garment selection unit 118 is further configured to track and monitor the uploaded images of apparels and memories of the users. The garment selection unit 118 is configured to track and monitor one or more images, which are posted by the users wearing the apparels or providing the memory of the user on the user's social media platforms.

In an embodiment of the present invention, the feature optimization unit 122 in communication with the garment selection unit 118 is configured to automatically perform one or more image editing operations on the uploaded images for optimally embedding the image into the panel. The editing operations include, but are not limited to, cropping and rotation of the images. In an embodiment of the present invention, the feature optimization unit 122 is configured to render an option to the user for further editing the automatically edited images. In an embodiment of the present invention, the embedding of the edited images into the panels of the garment type template is based on at least two scenarios. Firstly, the edited (e.g. cropped) image may fit inside the panel of the garment type template for at least one angle. Secondly, the edited (e.g. cropped) image may fit inside the panel of the garment type template for all rotational angles. The rotational angle is computed by the feature optimization unit 122 from mid-point of the panels in the garment type template.

In an embodiment of the present invention, the feature optimization unit 122 provides instructions via the UI rendered on the user device 110 for uploading the images. The instructions may include capturing multiple images of the apparel and memories from multiple angles using camera present on the user device 110. The capturing of multiple images of the apparel and memories from multiple angles aids in computing size of the region in the image and effectively generating 2D or 3D images of the apparel and images. The feature optimization unit 122 is configured to estimate the camera position and accordingly triangulate for carrying out monocular simultaneous localization and mapping operation on the user device 110 for effectively capturing the images. In an embodiment of the present invention, the feature optimization unit 122 is configured to instruct the user to place a reference object at least on top left corner or left side of at least the apparel and memory for effectively estimating the camera position and accordingly carry out triangulation for capturing at least the apparel and memory image prior to uploading. Further, the placement of the reference object aids in determining the size of the apparel and memory, accurately computing the dimensions of the apparel or memory and further determining the size of the garment type on which the apparel or memory is to be placed for accurate placement.

In an embodiment of the present invention, the feature optimization unit 122 is configured to compute pixel per distance metric of the edited (e.g. cropped) region in the image for determining the size of the edited (e.g. cropped) region in the apparel or memory image. The feature optimization unit 122 is configured to compute pixel per distance metric based on firstly, converting the captured apparel or memory image to a grayscale and further smoothing the grayscale apparel or memory image using a Gaussian filter. Secondly, the feature optimization unit 122 is configured to carry out an edge detection operation of the captured apparel or memory image along with erosion and dilation operations to close gaps in edges in an edge map of the apparel or memory image. Advantageously, the edge detection operation aids in removing uneven edges in the images and further removes gaps in the edges in the edge map of the images. Thirdly, the feature optimization unit 122 is configured to determine one or more contours corresponding to the objects in the edge map. The contours are determined based on applying at least, but are not limited to, canny edge detector technique, semantic segmentation technique, Hough transform technique and k-means segmentation technique. Fourthly, the feature optimization unit 122 is configured to sort the contours from at least top left to bottom right of the captured apparel image. Further, as the reference object is placed on the top left corner or left side of the apparel or memory, the sorting of contours ensure that the reference object contour are placed in a first index. The first index, therefore, comprises the reference object contours.

Figure 4:
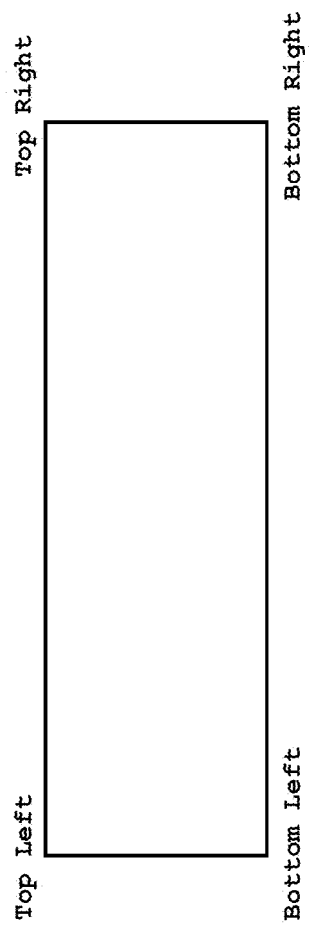
FIG. 4 illustrates a contour of a reference object as a bounded rectangle shape, in accordance with an embodiment of the present invention.
Figure 5:
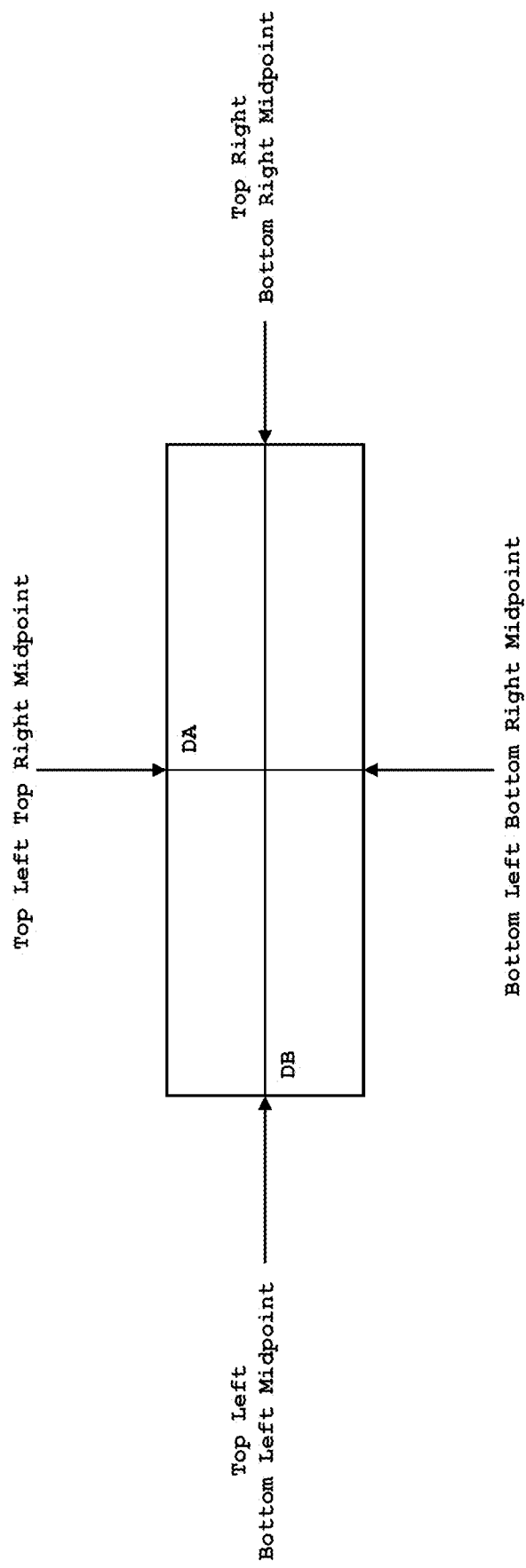
FIG. 5 illustrates computation of a Euclidean distance 'DA' and 'DB' for determining contour of a reference object, in accordance with an embodiment of the present invention.

In an embodiment of the present invention, the feature optimization unit 122 is configured to generate the contour of the reference object as a bounded rectangle shape, as illustrated in FIG. 4. The feature optimization unit 122 is configured to generate the contour (first contour) of the reference object by computing: midpoint of top left and top right corner of the bounded rectangle shape; midpoint of bottom left and bottom right corner of the bounded rectangle shape; midpoint of top left and bottom left corner of the bounded rectangle shape; and midpoint of top right and bottom right corner of the bounded rectangle shape, as illustrated in FIG. 5. Fifthly, the feature optimization unit 122 is configured to compute a Euclidean distance 'DA' and 'DB' for determining the contour of the reference object, as illustrated in FIG. 5. 'DA' represents a Euclidean distance between top left and top right midpoint and bottom left bottom right midpoint of the bounded rectangle shape. Further, 'DB' represents a Euclidean distance between top left and bottom left midpoint and top right bottom right midpoint of the bounded rectangle shape. Alternatively, 'DA' represents height of the contour of reference object and 'DB' represents width of the contour of the reference object. Finally, the feature optimization unit 122 is configured to compute the pixel per distance metric for the edited (e.g. cropped) region in the image using the following formula:

'Pixel per distance metric'='DB'/'Known width of the reference object'

Figure 6:
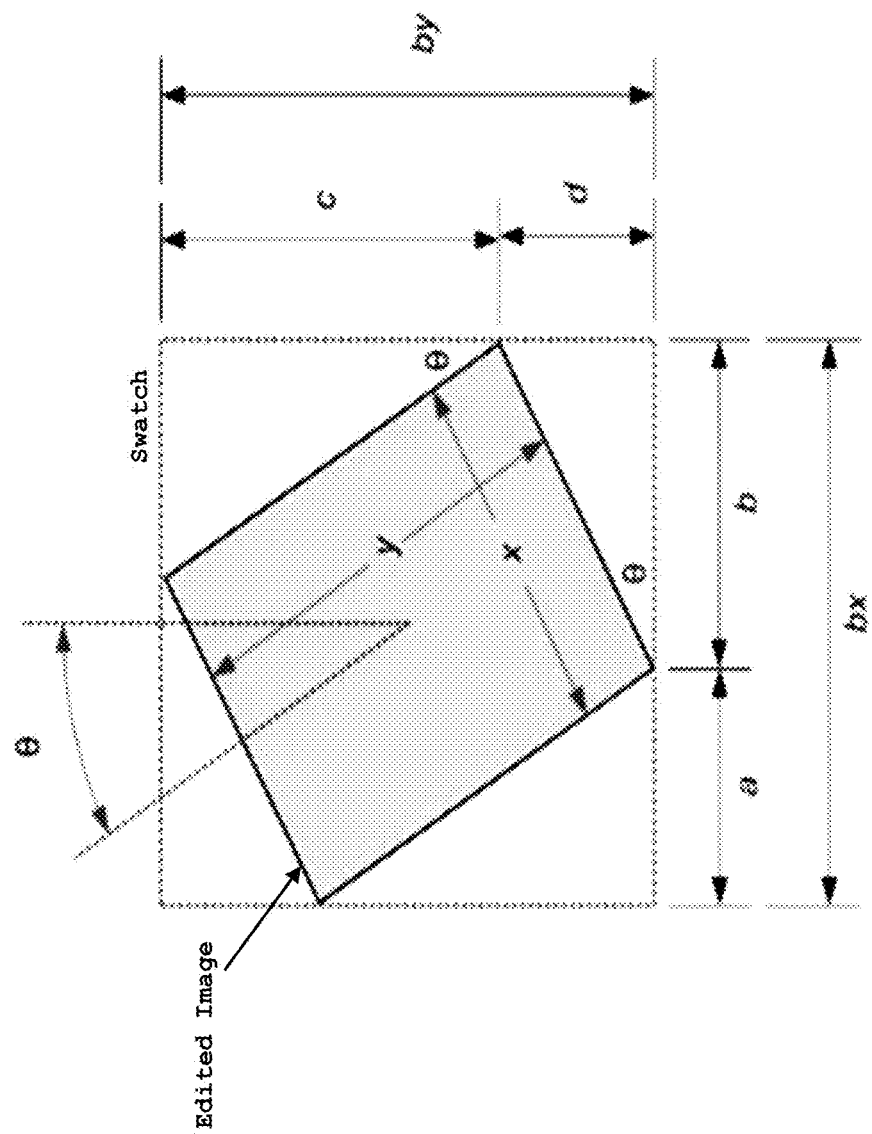
FIG. 6 illustrates an edited image as a swatch, in accordance with an embodiment of the present invention.

In an embodiment of the present invention, subsequent to computation of the pixel per distance metric, the feature optimization unit 122 is configured to store the computed pixel per distance metric along with the captured apparel or memory image in the database 126 as a metadata of the captured apparel or memory image. In an embodiment of the present invention, the garment selection unit 118 in communication with the feature optimization unit 122 is configured to fetch the stored apparel or memory image from the database 126 for rendering on the user device 110 via the UI for editing (e.g. cropping) the region of the apparel or memory image and adding as a swatch in the garment type template for garment designing, as illustrated in FIG. 6.

In an embodiment of the present invention, the feature optimization unit 122 is configured to compute the swatches in the garment type template which fits the edited (e.g. cropped) region of the apparel or memory image for a specific angle of rotation of the edited (e.g. cropped) region of the apparel or memory image. In an embodiment of the present invention, the feature optimization unit 122 is configured to compute the swatches in the garment type template that fit the edited (e.g. cropped) region of the apparel or memory image based on firstly, initializing a convex polygon ('polygon A') with a midpoint of a concave polygon ('polygon B') as origin. Secondly, the feature optimization unit 122 is configured to compute every rotational angle of the convex polygon. Thirdly, the feature optimization unit 122 is configured to compute multiple points corresponding to the convex polygon ('polygon A') with rotational angle and subsequently places all the points of both rotated convex polygon and concave polygon in a set of points. The feature optimization unit 122 is further configured to determine a new convex polygon ('polygon C') from the set of points, using a graham scan technique executing a convex hull algorithm, which comprises both the convex and concave polygons and have multiple vertex points. Finally, the feature optimization unit 122 is configured to perform a check to determine if the 'polygon C' and the 'polygon B' are same having same set of vertex points. Further, if the 'polygon C' and the 'polygon B' are same having same set of vertex points then it is determined that the 'polygon B' contains the 'polygon A' and the swatches in the garment type template fits the edited (e.g. cropped) region of the apparel or memory image for a specific angle of rotation. Further, if the 'polygon C' and the 'polygon B' are not same and does not have same set of vertex points then it is determined that the 'polygon B' does not contain the 'polygon A' and the swatches in the garment type template does not fit the edited (e.g. cropped) region of the apparel or memory image for a specific angle of rotation. The feature optimization unit 122 is configured to continue performing check for other angles of rotation for all the swatches, which are unoccupied in the garment type template for carrying out garment creation and designing. The unoccupied panels are those panels which are not uploaded with the apparel or memory images.

In an embodiment of the present invention, the feature optimization unit 122 in communication with the garment selection unit 118 is configured to automatically highlight the panels of the garment type template for users for embedding with the edited images, subsequent to the editing of the images. In an embodiment of the present invention, the garment selection unit 118 is configured to tag the one or more highlighted panels on the UI for embedding the one or more uploaded edited images by clicking on a panel in the UI for embedding the edited image into one of the tagged panels. Similarly, the user may select different tagged panels for embedding with images. In an embodiment of the present invention, the garment selection unit 118 in communication with the feature optimization unit 122 is further configured to provide a drag and drop functionality on the UI for embedding the edited images into the panels of the garment type template for garment creation and designing.

In an embodiment of the present invention, the garment selection unit 118 in communication with the feature optimization unit 122 is configured to provide an option on the UI to preview a created and designed garment type subsequent to the embedding of images in the panels. Options are provided on the UI to the user to accept and proceed to next panel or reject and select another apparel or memory image and upload on the UI via the user device 110 for embedding in the panel. In an embodiment of the present invention, the feature optimization unit 122 is further configured to enhance one or more characteristics of the generated designed garment type such as, but are not limited to, brightness, contrast and transparency on the UI.

In an embodiment of the present invention, the garment selection unit 118 in communication with the feature optimization unit 122 is further configured to generate at least a 2D and a 3D representation of the designed garment type with the embedded apparel or memory image in the panel and render on the UI. In an embodiment of the present invention, the feature optimization unit 122 is trained using machine learning and deep learning techniques for generating the 2D and 3D representation of the designed garment type with the embedded image (apparel image or memory image) in the panel.

In an embodiment of the present invention, the avatar generation unit 120 of the engine 104 is configured to generate an avatar of the user for displaying the designed garment type on the user via the UI from different sides (e.g. a front side and a back side) of the user as a virtual try-on technique. The avatar generation unit 120 is trained using deep learning techniques, such as convolution neural networks (CNN), for generating an avatar of the user. The avatar generation unit 120 is further configured to use augmented reality (AR) technique for generating the avatars. The user may provide his or her body images from various angles via the UI rendered on the user device 110, which are processed by the avatar generation unit 120 using deep learning techniques for generating the avatar of the user.

Further, in an embodiment of the present invention, the avatar generation unit 120 is configured to generate at least a graphical representation or a model of the designed garment type in avatar form on the UI and render via the user device 110. Further, the generated avatar form may be in a dynamic 3D form. In an embodiment of the present invention, the avatar generation unit 120 is further configured to generate the one or more avatars for carrying out a virtual fashion show in which the user may display his or her designed garments via the avatars on the UI. The user may share his or her designed garments on various social media platforms, collaborate with other users and sell the designed garments using an e-commerce platform via the UI on the user device 110.

In an embodiment of the present invention, the feedback unit 130 of the engine 104 is configured to enable the user to request a feedback and modifications from other users with respect to the created and designed garment type. The feedback may be received by the feedback unit 130 in the form of, but is not limited to, voice messages and emails. Further, based on the feedback received by the user, the user may collaborate with other users for garment type designing and modification of the designed garments.

In various embodiments of the present invention, the engine 104 facilitates users to design multiple garment types, save any unfinished changes to the garment type in the database 126 and continue from the point where user had left designing the garment. In an embodiment of the present invention, for each new design, a unique ID is assigned by the database 126 for storage and future retrieval. Further, the user may upload images from database 126 for creating and designing a new garment type, edit the image, drag and drop the image on the garment type template for embedding in the one or more panel on the garment type template and adjust rendering according to his or her needs and thereafter approve the final designed garment on the UI. The final designed garment is stored in the database 126.

In an embodiment of the present invention, subsequent to the approval of the final designed garment by the user, the designed garment is sent for stitching and sewing via the inventory management unit 134 to a garment stitching and sewing workshop and stored in a warehouse. In an exemplary embodiment of the present invention, a layout of the designed garment is generated by the inventory management unit 134 in the form of a report providing an indication with cross-reference between panels and fabric chosen for clear and concise placement during stitching and sewing. Further, the report is password protected and provided to the garment stitching and sewing workshop via the inventory management unit 134 for stitching and sewing of the designed garment. In an embodiment of the present invention, the user may place an order for purchasing the designed garment using the subscription unit 132 of the engine 104. The subscription unit 132 is configured to generate a personalized payment universal resource locator (URL) link, which is provided to the user on the UI via the user device 110. In the event payment is made, the order is automatically created by the subscription unit 132 and a confirmation of the payment receipt and order placement are sent by the subscription unit 132 on the user device 110, via an email, a short messaging service (SMS) or directly on the actionable UI. The user may manage the orders using the subscription unit 132 and further the user may at least add, delete or modify the payment methods by using the subscription unit 132.

In an embodiment of the present invention, the repurposing unit 128 is configured to render an option to the user via the UI for sending unused garments and apparels to the warehouse, where the unused garments and apparels are at least reused, repurposed into new garments, resold as secondhand garments, repaired for extending life and recycled using mechanical, chemical and thermal processes. Further, the repurposing unit 128 is configured to render an option to the users for creating an online garment store for displaying and selling of the designed garment. Further, the different users may at least purchase and reserve the displayed garment.

In an embodiment of the present invention, the inventory management unit 134 is configured to regulate at least one or more in-house material inventory feeds and one or more external material inventory feeds for effectively managing the inventory for material requirement of the garment stitching and sewing, subsequent to the designing of the garment type. In an embodiment of the present invention, the inventory management unit 134 is configured to manage three types of feeds comprising one or more real-time inventory feeds received via a network socket, one or more near real-time inventory feeds received via the network socket or an inventory provider Application Programming Interface (API) and a last updated time based API inventory call to inventory provider API for fetching one or more incremental inventory updates. Further, the inventory management unit 134 is configured to regulate material feeds from multiple overstock material providers. In an embodiment of the present invention, the inventory management unit 134 is configured to prevent the garment warehouse from overstocking, as the designed garment is stitched and sewed only after the user has ordered.

In an embodiment of the present invention, the inventory management unit 134 is configured to maintain the inventory data in an indexed format using an elastic search cluster technique and further the inventory data is accessible via a material master API. Further, the inventory management unit 134 is configured to provide one or more options for regulating the in-house material inventory feeds and the external material inventory feeds such as, but are not limited to, material API, Material Display Page (MDP), add to cart and express checkout for interacting with material master API in order to validate fulfilment of material requirements for garment stitching and sewing.

Figure 7:
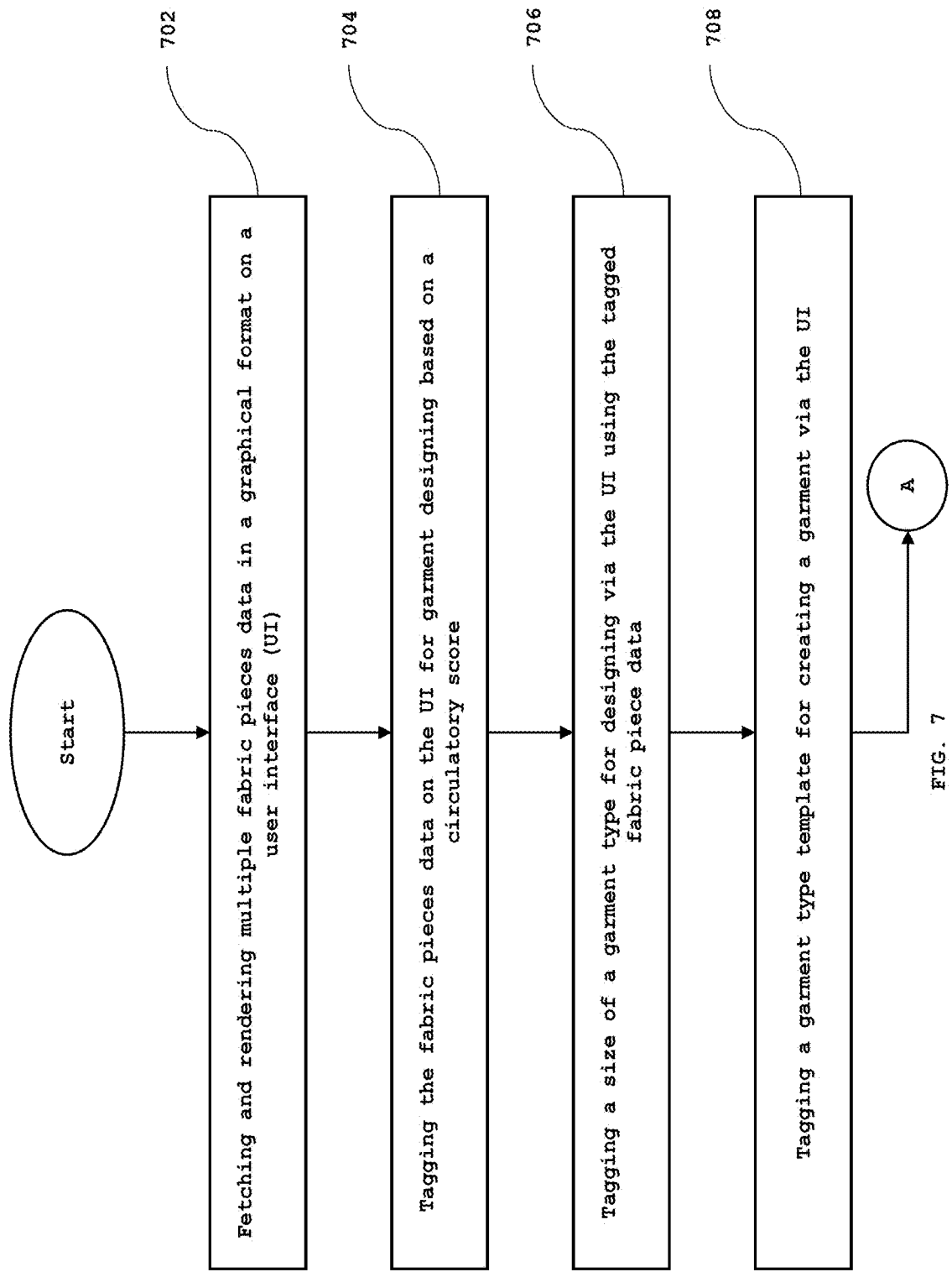
FIG. 7 and FIG. 7A is a flowchart illustrating a method for generating an optimized online garment creation platform, in accordance with an embodiment of the present invention.
Figure 7A:
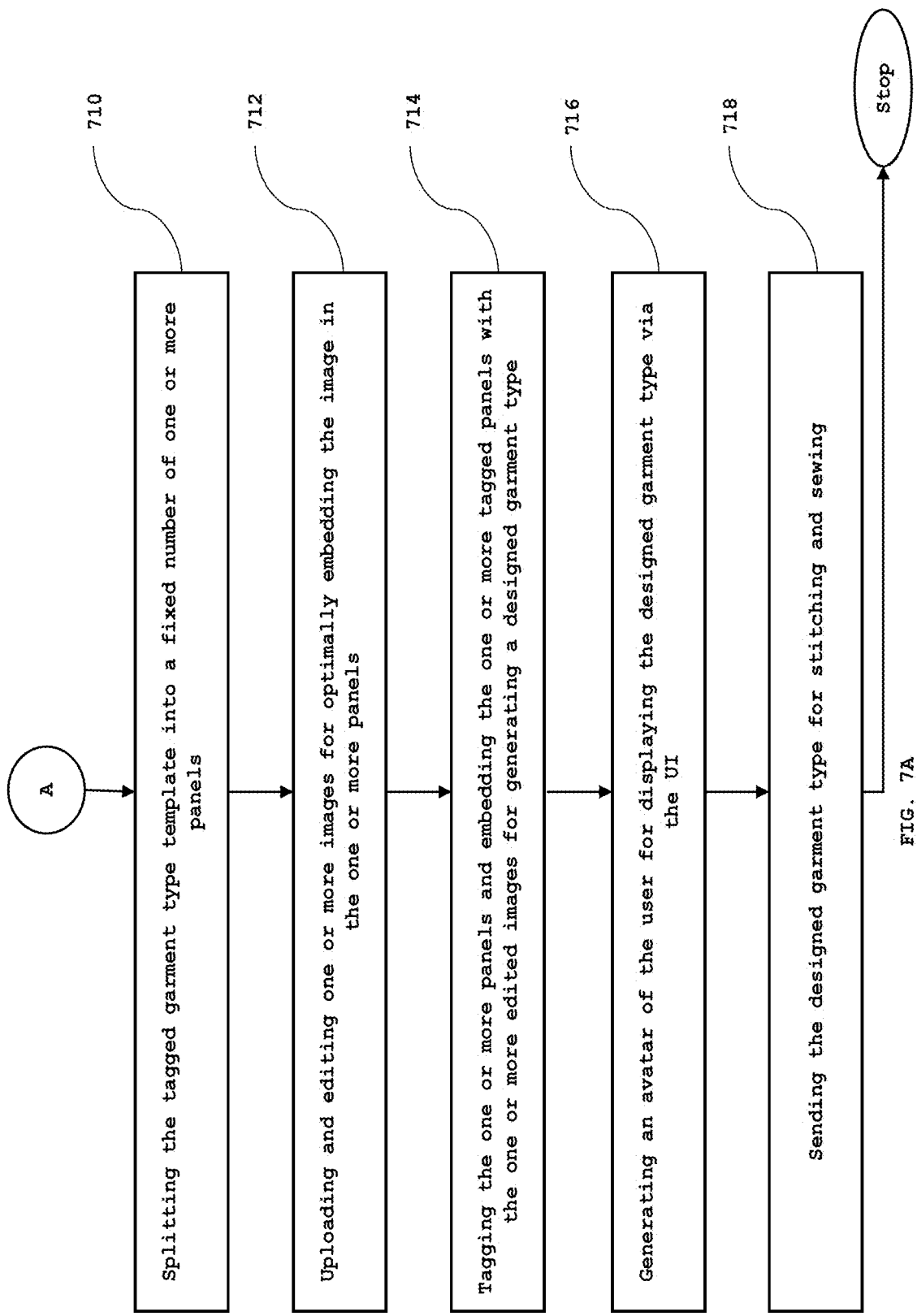

FIG. 7 and FIG. 7A is a flowchart illustrating a method for generating an optimized online garment creation interface, in accordance with various embodiments of the present invention.

At step 702, multiple fabric pieces data are fetched and rendered in a graphical format on a user interface (UI). In an embodiment of the present invention, one or more user inputs are received for garment creation and designing on an actionable UI. The actionable UI is generated and rendered on a user device. In an exemplary embodiment of the present invention, the actionable UI renders a dashboard comprising one or more options associated with the garment creation and designing. The one or more options associated with garment creation and designing may include, but are not limited to, size selection option, color selection option, base pattern selection option, thread selection option, type of fabric selection option and collaboration option with other users for designing of the garments. The user may access the UI for garment creation and designing via the user device using a unique ID associated with the user. The inputs are received and analyzed for determining requirements for garment creation and designing associated with the received inputs. The analyzed inputs are in the form of a first set of instructions. Based on the first set of instructions, a second set of instructions are generated for fetching and rendering stored multiple fabric pieces data from a database in the graphical file format. The multiple fabric pieces data are catalogued in the database in a graphical file format for storage. The multiple fabric pieces data are fetched and rendered on the UI in a graphical format based on the analyzed inputs. The multiple fabric pieces data stored in the database is associated with fabric use data, fabric pattern data, fabric styles data, fabric default fitting data and type of fabric piece data.

In another embodiment of the present invention, the multiple fabric pieces data stored in the database may include photographs of fabric pieces available at user device and uploaded by the user via the UI. The uploaded photographs are analyzed and fabric pieces data corresponding to the photographs are transmitted to the database for storage in a graphical file format. Further, the stored photographs of the fabric pieces data are also be rendered on the UI along with other pre-stored fabric pieces data based on the received inputs. In another embodiment of the present invention, the UI is configured to render fabric pieces data from a third party entity in addition to the fabric pieces data stored in the database.

In an exemplary embodiment of the present invention, the fabric pieces data may be associated with fabric usage, fabric pattern data, fabric styles data, fabric default fitting data and type of fabric piece data. Further, each of the fabric pieces data stored in the database is associated with a metadata. The metadata includes one or more parameters such as, but are not limited to, data related to material of the fabric piece, reusability of the fabric piece, environmental impact of the fabric piece, recycling efficiency of the fabric piece and life extension of the fabric piece.

In an embodiment of the present invention, different types of fabric pieces data may be selected via the UI for creating and designing multiple personalized garment types in a graphical format. In various exemplary embodiments of the present invention, the garments may be created and designed for men, women and kids comprising shirts, t-shirts, trousers, jeans, chinos, shorts, gowns, jackets, coats, skirts, tops, scarfs, nightwear, underwear, traditional wear (e.g. kurta, saree etc.), formal wear, party wear, etc. of different sizes (e.g. extra-small, small, medium, large, extra-large, etc.) and designs. Further, accessories, home furnishing, bags, blankets, quilts may also be created and designed. The garment types are pre-stored in the database in the form of one or more templates and are fetched and rendered on the UI based on selection of options provided in the UI rendered on the user device.

At step 704, the fabric pieces data is tagged on the UI for garment designing based on a circulatory score. In an embodiment of the present invention, the fabric pieces data is tagged on the UI for garment designing based on a computed circulatory score associated with the fabric pieces metadata. The circulatory score is displayed on the UI along with each fabric piece data. The circulatory score is computed separately for each of the parameters associated with the fabric piece metadata, such as, the material of the fabric piece, reusability of the fabric piece, environmental impact of the fabric piece, recycling efficiency of the fabric piece and life extension of the fabric piece. Subsequent to computation of the separate circulatory score for each parameter, a cumulative circulatory score is computed for the each of the fabric piece parameters associated with the fabric piece metadata. In an exemplary embodiment of the present invention, the circulatory score is in the range of between 0-100 such that higher the circulatory score more suitable is the fabric piece.

At step 706, a size of a garment type is tagged for designing via the UI using the tagged fabric piece data. In an embodiment of the present invention, various size options are provided on the UI based on received inputs for tagging the size of the garment type. The size options provided to the user may be in one or more measurement standards such as, centimetres (cm) and inches depending upon the metric system followed in the country from which the user is accessing the UI for garment creation and designing.

At step 708, a garment type template is tagged for creating a garment via the UI. In an embodiment of the present invention, subsequent to tagging the size of the garment type, various garment types in a template form are fetched and rendered on the UI. The garment type template is representative of the garment which the user intends to create and design such as, but is not limited to, a shirt, a jeans, a trouser, a skirt, etc. In an embodiment of the present invention, the garment type template is tagged for garment creation and designing on the UI based on a selection made by the user via the UI. In an embodiment of the present invention, the measurement of the garment type template is split into one or more components based on the tagged size of the garment type before rendering the garment type template on the UI. For example, if the garment type template is of a jacket, then the components of the jacket may include, but are not limited to, jacket flat, hood, pocket and sleeves. In an embodiment of the present invention, fabric piece requirement for garment creation and designing, in subsequent stages of garment creation and designing, is automatically computed based on the tagged size.

In an embodiment of the present invention, one or more designs are rendered for selection via the UI for creation and designing the garment type template. The designs relate to various garment type templates and stored in the database. Based on the selected design one or more design elements are selected. Examples of design elements include, but are not limited to, color, pattern and style for the selected garment type template. The design and the design elements are pre-stored in the database which are retrieved for rendering on the UI. The image of the selected design is displayed on the UI. In another embodiment of the present invention, one or more virtual designs are automatically generated for the garment type template by randomly fetching images from the database and overlaying the fetched images on the garment type template.

At step 710, the tagged garment type template is split into a fixed number of one or more panels. In an embodiment of the present invention, the tagged garment type template is split into a fixed number of one or more panels after the design selection. In an exemplary embodiment of the present invention, the garment type template comprises 32 panels and further 10 garment type templates are provided for splitting into panels. Further, the number of panels may be different for each garment type template based on the user requirements. The panels are selected at least on the front (F) of the garment type template and on the back (B) of the garment type template. Further, dimensions and layout of the panels varies based on the tagged garment type template. The size of the panels is at least increased and decreased based on the user requirements and, therefore, the panels may be small or large in size. In an embodiment of the present invention, panel parameters information such as, but is not limited to, size, shape and placement of panels is determined based on the inputs received via the UI. Further, the determined panel parameters information is transmitted to the database for storage and future retrieval.

At step 712, one or more images are uploaded and edited for optimally embedding the image into the one or more panels. In an embodiment of the present invention, the panels are configurable for being embedded with images as logos. The uploaded images via the UI. The images relate to apparels and memories of the users. The uploaded images on the UI are edited and modified for embedding and sewing the uploaded image on to the panel of the garment type template as the logo. In an exemplary embodiment of the present invention, the images of the memories may relate to, but are not limited to, an image of happy moment in the user's life, an image of user's interest, an image of an event and an image of a monument. The images may be uploaded on the UI by accessing an image library of the user device or a social media website. In an embodiment of the present invention, the uploaded images of apparels and memories of the users are tracked and monitored. The one or more images are tracked and monitored which are posted by the users wearing the apparels or providing the memory of the user on the user's social media platforms.

In an embodiment of the present invention, one or more image editing operations are automatically performed on the uploaded images for optimally embedding the image into the panel. The editing operations include, but are not limited to, cropping and rotation of the images. In an embodiment of the present invention, an option is rendered to the user for further editing the automatically edited images. In an embodiment of the present invention, the embedding of the edited images into the panels of the garment type template is based on at least two scenarios. Firstly, the edited (e.g. cropped) image may fit inside the panel of the garment type template for at least one angle. Secondly, the edited (e.g. cropped) image may fit inside the panel of the garment type template for all the rotational angles. The rotational angle is computed from mid-point of the panels in the garment type template.

In an embodiment of the present invention, instructions are provided via the user device for uploading the images. The instructions may include capturing multiple images of the apparel and memories from multiple angles using camera present on the user device. The camera position is estimated and accordingly triangulated for carrying out monocular simultaneous localization and mapping operation on the user device for effectively capturing the images. In an embodiment of the present invention, the user is instructed to place a reference object at least on top left corner or left side of at least the apparel and memory for effectively estimating the camera position and accordingly carry out triangulation for capturing at least the apparel and memory image prior to uploading.

In an embodiment of the present invention, pixel per distance metric of the edited (e.g. cropped) region is computed in the image for determining the size of the edited (e.g. cropped) region in the apparel or memory image. The pixel per distance metric is computed based on firstly, converting the captured apparel or memory image to a grayscale and further smoothing the grayscale apparel or memory image using a Gaussian filter. Secondly, an edge detection operation of the captured apparel or memory image is carried out along with erosion and dilation operations to close the gaps in edges in an edge map of the apparel or memory image. Thirdly, one or more contours corresponding to the objects in the edge map is determined. The contours are determined based on applying at least, but are not limited to, canny edge detector technique, semantic segmentation technique, Hough transform technique and k-means segmentation technique. Fourthly, the contours from at least top left to bottom right of the captured apparel image are sorted. Further, as the reference object is placed at least on the top left corner or left side of the apparel or memory, the sorting of contours ensure that the reference object contour are placed in a first index. The first index, therefore, comprises the reference object contours.

In an embodiment of the present invention, the contour of the reference object as a bounded rectangle shape is generated. The contour (first contour) of the reference object is generated by computing: midpoint of top left and top right corner of the bounded rectangle shape; midpoint of bottom left and bottom right corner of the bounded rectangle shape; midpoint of top left and bottom left corner of the bounded rectangle shape; and midpoint of top right and bottom right corner of the bounded rectangle shape. Fifthly, a Euclidean distance 'DA' and 'DB' is computed for determining the contour of the reference object. 'DA' represents a Euclidean distance between top left and top right midpoint and bottom left bottom right midpoint of the bounded rectangle shape. Further, 'DB' represents a Euclidean distance between top left and bottom left midpoint and top right bottom right midpoint of the bounded rectangle shape. Alternatively, 'DA' represents height of the contour of reference object and 'DB' represents width of the contour of the reference object. Finally, the pixel per distance metric is computed for the edited (e.g. cropped) region in the image using the following formula:

'Pixel per distance metric'='DB'/'Known width of the reference object'

Further, subsequent to computation of the pixel per distance metric, the computed pixel per distance metric along with the captured apparel or memory image are stored in the database as a metadata of the captured apparel or memory image. In an embodiment of the present invention, the stored apparel or memory images are fetched from the database for rendering on the user device for editing (e.g. cropping) the region of the apparel or memory image and adding as a swatch in the garment type template for garment designing.

In an embodiment of the present invention, the swatches in the garment type template which fits the edited (e.g. cropped) region of the apparel or memory image for a specific angle of rotation of the edited (e.g. cropped) region of the apparel or memory image are computed. The swatches in the garment type template that fits the edited (e.g. cropped) region of the apparel or memory image are determined and computed based on firstly, initializing a convex polygon ('polygon A') with a midpoint of a concave polygon ('polygon B') as origin. Secondly, every rotational angle of the convex polygon is computed. Thirdly, multiple points corresponding to convex polygon ('polygon A') are computed with rotational angle and subsequently all the points of both rotated convex polygon and concave polygon are placed in a set of points. Further, a new convex polygon ('polygon C') is determined from the set of points using a graham scan technique executing a convex hull algorithm, which comprises both the convex and concave polygons and have multiple vertex points. Finally, a check is performed to determine if the 'polygon C' and the 'polygon B' are same having same set of vertex points. Further, if the 'polygon C' and the 'polygon B' are same having same set of vertex points then it is determined that the 'polygon B' contains the 'polygon A' and the swatches in the garment type template fits the edited (e.g. cropped) region of the apparel or memory image for a specific angle of rotation. Further, if the 'polygon C' and the 'polygon B' are not same and does not have same set of vertex points then it is determined that the 'polygon B' does not contain the 'polygon A' and the swatches in the garment type template does not fit the edited (e.g. cropped) region of the apparel or memory image for a specific angle of rotation. The check for other angle of rotation is continued for all the swatches which are unoccupied in the garment type template for carrying out the garment creation and designing. The unoccupied panels are those panels which are not uploaded with the apparel or memory images.

At step 714, one or more panels are tagged and the one or more tagged panels are embedded with the one or more edited images for generating a designed garment type. In an embodiment of the present invention, subsequent to the editing of the images the panels of the garment type template are automatically highlighted for users for embedding the edited images in the panels. In an embodiment of the present invention, the one or more highlighted panels are tagged on the UI for being embedded with the one or more uploaded edited images based on clicking on a panel in the UI. In an embodiment of the present invention, a drag and drop functionality is provided on the UI for embedding the edited images into the panels of the garment type template for garment designing.

In an embodiment of the present invention, an option is provided on the UI to preview a created and designed garment type subsequent to embedding of images into the panels. Options are provided on the UI for the user to accept and proceed to next panel or reject and select another apparel or memory image and upload on the UI for embedding into the panel. In an embodiment of the present invention, one or more characteristics of the generated designed garment type are enhanced such as, but are not limited to, brightness, contrast and transparency on the UI.

In an embodiment of the present invention, at least a 2D and a 3D representation of the designed garment type is generated with the embedded apparel or memory image in the panel and rendered on the UI. In an embodiment of the present invention, the 2D and 3D representation of the designed garment type is generated with the embedded image (apparel image or memory image) in the panel using machine learning and deep learning techniques.

At step 716, an avatar of the user is generated for displaying the designed garment type via the UI. In an embodiment of the present invention, an avatar of the user is generated for displaying the designed garment type on the image of the user via the UI from different sides (e.g. a front side and a back side) of the user as a virtual try-on technique. The avatar is generated using deep learning techniques, such as convolution neural networks (CNN). Further, augmented reality (AR) technique is also used for generating the avatars. The user may provide his or her body images from various angles via the UI rendered on the user device which are processed using deep learning techniques for generating the avatar of the user. Further, in an embodiment of the present invention, at least a graphical representation or a model of the designed garment type is generated in avatar form on the UI and rendered via the user device. Further, the generated avatar form may be in a dynamic 3D form. In an embodiment of the present invention, the one or more avatars are generated for carrying out a virtual fashion show in which the user may display his or her designed garments via the avatars on the UI. The user may share his or her designed garments on various social media platforms, collaborate with other users and sell the designed garments using an e-commerce platform via the UI on the user device.

In an embodiment of the present invention, the user may request a feedback and modifications from other users with respect to the created and designed garment type. The feedback may be received in the form of, but is not limited to, voice messages and emails. Further, based on the feedback received by the user, the user may collaborate with other users for garment type designing and modification of the designed garments.

In an embodiment of the present invention, the user may design multiple garment types, save any unfinished changes to the garment type in the database and continue from the point where the user had left the designing of the garment. In an embodiment of the present invention, for each new design, a unique ID is assigned by the database for storage and future retrieval. Further, the user may upload images for creating and designing a new garment type, edit the image, drag and drop the image on the garment type template for embedding in the one or more panel on the garment type template and adjust rendering according to his or her requirements and thereafter approve the final designed garment on the UI.

At step 718, the designed garment type is sent for stitching and sewing. In an embodiment of the present invention, subsequent to the approval of the final designed garment by the user, the designed garment is sent for stitching and sewing to a garment stitching and sewing workshop and stored in a warehouse. In an exemplary embodiment of the present invention, a layout of the designed garment is generated in the form of a report providing an indication with cross-reference between panels and fabric chosen for clear and concise placement during stitching and sewing. Further, the report is password protected and provided to the garment stitching and sewing workshop for stitching and sewing of the designed garment. In an embodiment of the present invention, the user may place an order for purchasing the designed garment via the UI. Thereafter, a personalized payment universal resource locator (URL) link is generated, which is provided to the user on the UI via the user device. In the event payment is made, the order is automatically created and a confirmation of payment receipt and order placement are sent to the user device, via an email, a short messaging service (SMS) or directly on the actionable UI. The user may manage the orders and further the user may at least add, delete or modify the payment.

In an embodiment of the present invention, an option is rendered to the user via the UI for sending unused garments and apparels to the warehouse, where the unused garments and apparels are at least reused, repurposed into new garments, resold as secondhand garments, repaired for extending life and recycled using mechanical, chemical and thermal processes. Further, an option is rendered to the users for creating an online garment store for displaying and selling of the designed garment. Further, the different users may at least purchase and reserve the displayed garment.

In an embodiment of the present invention, at least one or more in-house material inventory feeds and one or more external material inventory feeds are regulated for effectively managing the inventory for material requirement of the garment stitching and sewing, subsequent to the designing of the garment type. In an embodiment of the present invention, three types of feeds are managed comprising one or more real-time inventory feeds received via a network socket, one or more near real-time inventory feeds received via the network socket or an inventory provider Application Programming Interface (API) and a last updated time based API inventory call to inventory provider API for fetching one or more incremental inventory updates. Further, material feeds from multiple overstock material providers are regulated. In an embodiment of the present invention, the garment warehouse is prevented from overstocking, as the designed garment is stitched and sewed only after the user has ordered.

In an embodiment of the present invention, the inventory data is maintained in an indexed format using an elastic search cluster technique and further the inventory data is accessible via a material master API. Further, one or more options are provided for regulating the in-house material inventory feeds and the external material inventory feeds such as, but are not limited to, material API, Material Display Page (MDP), add to cart and express checkout for interacting with material master API in order to validate fulfilment of material requirements for garment stitching and sewing.

Advantageously, in various embodiments of the present invention, the system 100 and the method is configured to efficiently optimize online garment designing. The present invention effectively provides for an optimized online garment designing platform by generating a dynamic actionable User Interface (UI). The present invention provides flexible online garment designing and garment customization options for online garment designing via the UI. Further, the present invention effectively caters to the user requirements for online assembly, construction and designing of the garment, by using machine learning and deep learning techniques. Further, the present invention provides robust online garment designing that is capable of effectively capturing and integrating the user inputs for garment designing. Further, the present invention provides effectively affixing various images as logos to garments for designing. Furthermore, the present invention provides personalized online garment designing experience to the user. Yet further, the present invention provides cost effective and environmental friendly online garment designing by providing options for reusing, repairing and recycling of the garments.

Figure 8:
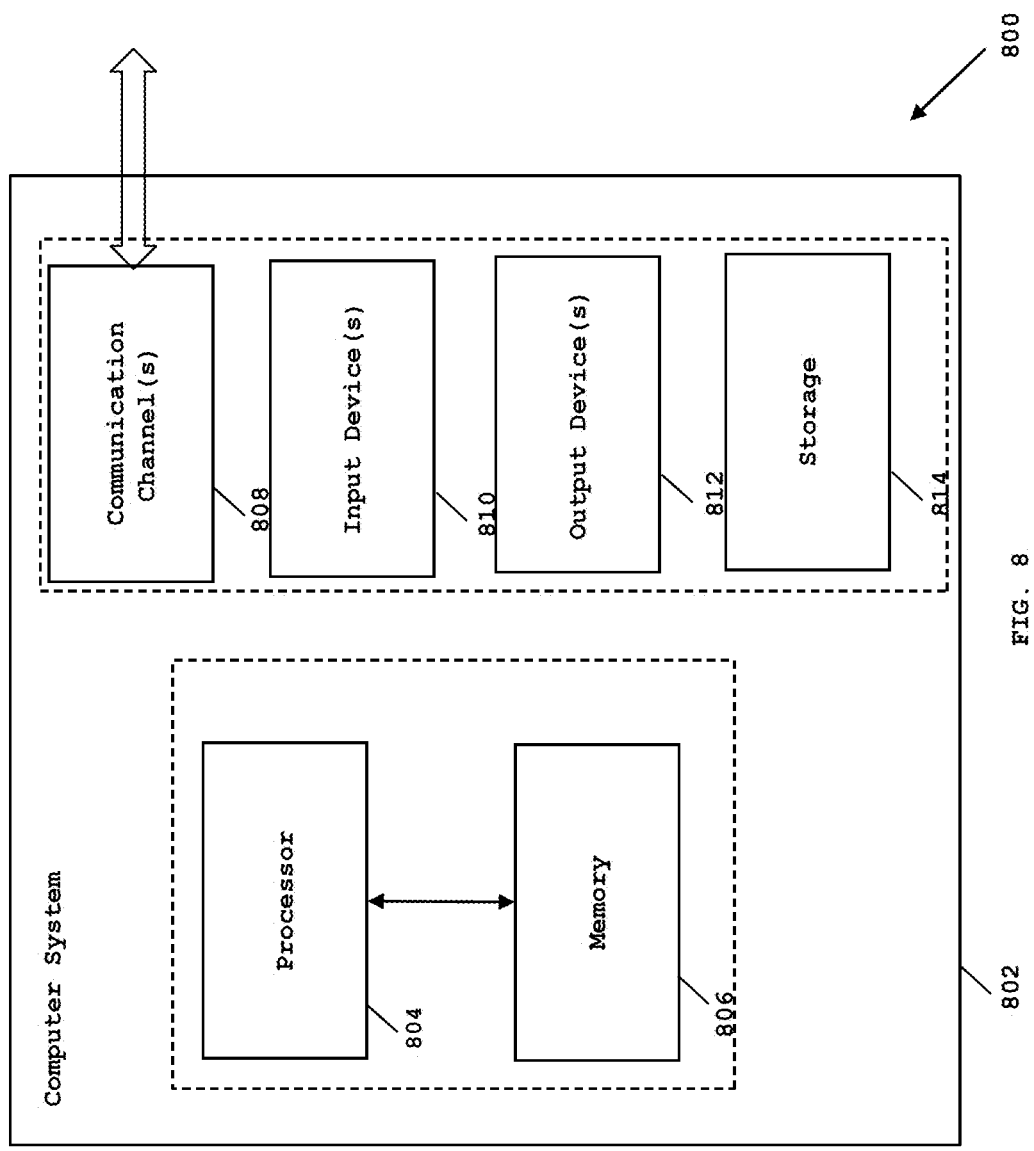
FIG. 8 illustrates an exemplary computer system in which various embodiments of the present invention may be implemented.

FIG. 8 illustrates an exemplary computer system in which various embodiments of the present invention may be implemented. The computer system 802 comprises a processor 804 (106, FIG. 1) and a memory 806 (108, FIG. 1). The processor 804 (106, FIG. 1) executes program instructions and is a real processor. The computer system 802 is not intended to suggest any limitation as to scope of use or functionality of described embodiments. For example, the computer system 802 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 806 (108, FIG. 1) may store software for implementing various embodiments of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802, and manages different functionalities of the components of the computer system 802.

The communication channel(s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 810 may include, but not limited to, a keyboard, mouse, pen, joystick, trackball, a voice device, a scanning device, touch screen or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT or LCD, printer, speaker, CD/DVD writer, or any other device that provides output from the computer system 802.

The storage 814 may include, but not limited to, magnetic disks, magnetic tapes, CD-ROMs, CD-RWs, DVDs, flash drives or any other medium which can be used to store information and can be accessed by the computer system 802. In various embodiments of the present invention, the storage 814 contains program instructions for implementing the described embodiments.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for generating an optimized online garment creation platform, the system comprising:
    a memory storing program instructions;
    a processor executing the program instructions stored in the memory; and
    a garment creation engine executed by the processor and configured to:
    render multiple fabric pieces data via a user interface (UI) on a user device;
    tag the one or more fabric pieces data on the UI based on a circulatory score, wherein the circulatory score is indicative of environmental impact of the fabric pieces data;
    tag a size of a garment type on the UI using the tagged fabric piece data for designing a garment via the UI;
    render one or more garment types in a template form on the UI, wherein the one or more garment type templates are tagged on the UI;
    split the tagged garment type template into a fixed number of one or more panels, wherein dimensions and layout of the panels vary based on the tagged garment type template;
    optimally embed images in the one or more panels of the garment type template, wherein a pixel per distance metric of an edited region of the image is computed for determining size of the edited region of the image;
    add the edited region of the image as a swatch in the garment type template, wherein the swatches which fit the edited region of the image for a specific angle of rotation of the edited region of the image are determined in the garment type template, and wherein the swatches are determined based on: initializing a convex polygon ('polygon A') with a midpoint of a concave polygon ('polygon B') as origin; computing every rotational angle of the convex polygon; computing multiple points corresponding to the convex polygon with rotational angle and subsequently placing all points of both the rotated convex polygon and concave polygon in a set of points; determining a new convex polygon ('polygon C') from the set of points that comprises both the convex and concave polygons having multiple vertex points; and performing a check to determine if the 'polygon C' and the 'polygon B' are having a same set of vertex points; and
    tag the one or more panels of the garment type template for embedding with the one or more edited images.

2. The system as claimed in claim 1, wherein the UI is an actionable UI generated by a user interface generation and recommendation unit of the garment creation engine and configured to capture user inputs for online garment creation and render a plurality of features for garment creation and designing via the UI.

3. The system as claimed in claim 1, wherein the UI renders a dashboard on the user device comprising one or more options associated with garment creation and designing for receiving inputs, and wherein the one or more options comprises size selection option, color selection option, base pattern selection option, thread selection option, type of fabric selection option and collaboration option with other users for designing the garments.

4. The system as claimed in claim 1, wherein the garment creation engine comprises a user input capturing unit for transmitting analyzed inputs associated with requirements for garment creation and designing as the first set of instructions to a user interface generation and recommendation unit within the garment creation engine, and wherein based on the first set of instructions the user interface generation and recommendation unit triggers a fabric and size selection unit within the garment creation engine, and wherein the fabric and size selection unit transmits a second set of instructions to the database for fetching and rendering the multiple fabric pieces data in a graphical format via the UI.

5. The system as claimed in claim 1, wherein the multiple fabric pieces data are catalogued in the database in a graphical file format for storage, and wherein the multiple fabric pieces data stored in the database is associated with fabric use data, fabric pattern data, fabric styles data, fabric default fitting data and type of fabric piece data.

6. The system as claimed in claim 5, wherein the multiple fabric pieces data comprises photographs uploaded by a user via the UI, the photographs are uploaded in a pre-defined format and correspond to one or more fabric pieces available at the user device, and wherein the photographs of the fabric pieces data are stored in the database in a graphical file format.

7. The system as claimed in claim 1, wherein the fabric pieces data is associated with a metadata, and wherein the metadata comprises one or more parameters such as data related to the material of the fabric piece, reusability of the fabric piece, environmental impact of the fabric piece, recycling efficiency of the fabric piece and life extension of the fabric piece.

8. The system as claimed in claim 7, wherein the garment creation engine comprises a circulatory score computation unit executed by the processor and configured to compute the circulatory score for each of the metadata associated with the fabric pieces data, and wherein the circulatory score is a cumulative circulatory score of the circulatory score computed separately for each of the parameters associated with the fabric piece metadata, the circulatory score is in a range of between 0-100 such that higher the circulatory score more environmentally suitable is the fabric piece.

9. The system as claimed in claim 1, wherein the garment creation engine comprises a fabric and size selection unit executed by the processor and configured to provide various size options on the UI based on received inputs for tagging the size of the garment type.

10. The system as claimed in claim 1, wherein the garment creation engine comprises a garment selection unit executed by the processor and configured to communicate with the database for fetching and rendering the garment types in the template form on the UI via a user interface generation and recommendation unit, and wherein the garment selection unit is configured to tag the garment type template for garment creation and designing on the UI based on a selection of a design rendered via the UI.

11. The system as claimed in claim 10, wherein the garment selection unit is further configured to split measurement of the garment type template into one or more components based on the size of the garment type tagged by a fabric and size selection unit in the garment creation engine before rendering on the UI.

12. The system as claimed in claim 10, wherein the garment selection unit is further configured to automatically compute fabric piece requirement for garment creation and designing based on the size tagged by the fabric and size selection unit on the UI.

13. The system as claimed in claim 10, wherein one or more design elements comprising color, pattern and style are selected via the UI for the garment type template based on the selected design, and wherein the garment selection unit is configured to display images of the selected design on the UI.

14. The system as claimed in claim 1, wherein the panels are selected at least on a front portion of the garment type template and on a back portion of the garment type template, and wherein size of the panels is at least increased and decreased based on user requirements, and wherein a garment selection unit in the garment creation engine executed by the processor is configured to determine panel parameters information comprising size, shape and placement of the panels based on inputs received via the UI.

15. The system as claimed in claim 1, wherein the garment creation engine comprises a garment selection unit executed by the processor and configured to upload images via the UI for embedding in the panels, the images relate to at least apparels and memories of the users, and wherein the images on the UI are uploaded by at least accessing an image library in the user device and from a social media website.

16. The system as claimed in claim 15, wherein the garment selection unit is configured to track and monitor the uploaded images of apparels and memories of the users.

17. The system as claimed in claim 1, wherein the garment creation engine comprises a feature optimization unit executed by the processor and configured to automatically perform one or more editing operations on one or more uploaded images comprising cropping and rotation of the images, and wherein the feature optimization unit is configured to provide an option to the user for further editing the automatically edited images.

18. The system as claimed in claim 1, wherein the embedding of the edited images into the panels of the garment type template comprises fitting the edited image inside the panel of the garment type template for at least one angle or fitting the edited image inside the panel of the garment type template for all rotational angles.

19. The system as claimed in claim 17, wherein the feature optimization unit is configured to estimate camera position and accordingly triangulate for carrying out monocular simultaneous localization and mapping operation on the user device for effectively capturing the images, and wherein the feature optimization unit is configured to instruct the user to place a reference object at least on the top left corner or left side of at least an apparel and memory image for effectively estimating the camera position and carrying out triangulation for capturing the apparel and memory image prior to uploading.

20. The system as claimed in claim 19, wherein the feature optimization unit is configured to compute the pixel per distance metric comprising the steps of:
   converting the captured apparel and memory image to a grayscale and smoothing the grayscale apparel and memory image using a Gaussian filter;
   carrying out an edge detection operation of the captured apparel and memory image along with erosion and dilation operations to close gaps in edges in an edge map of the apparel and memory image;
   determining one or more contours corresponding to the objects in the edge map, wherein the contours are determined based on applying at least canny edge detector technique, semantic segmentation technique, Hough transform technique and k-means segmentation technique;
   sorting the contours from at least top left to bottom right of the captured apparel image;
   computing a Euclidean distance for determining the contour of the reference object; and
   computing the pixel per distance metric for the edited region of the image.

21. The system as claimed in claim 19, wherein the feature optimization unit is configured to generate a contour of the reference object as a bounded rectangle shape, and wherein the contour of the reference object is generated by computing: midpoint of top left and top right corner of the bounded rectangle shape, midpoint of bottom left and bottom right corner of the bounded rectangle shape, midpoint of top left and bottom left corner of the bounded rectangle shape, and midpoint of top right and bottom right corner of the bounded rectangle shape.

22. The system as claimed in claim 1, wherein the swatches in the garment type template which fit the edited region of at least an apparel and a memory image are determined, the new convex polygon ('polygon C') is determined from the set of points using a graham scan technique executing a convex hull algorithm, and wherein if the 'polygon C' and the 'polygon B' are same having the same set of vertex points then it is determined that the 'polygon B' contains the 'polygon A' and the swatches in the garment type template fits the edited region of at least the apparel and memory image for a specific angle of rotation, and wherein if the 'polygon C' and the 'polygon B' are not same and does not have the same set of vertex points then it is determined that the 'polygon B' does not contain the 'polygon A' and the swatches in the garment type template does not fit the edited region of at least the apparel and memory image for a specific angle of rotation.

23. The system as claimed in claim 1, wherein the garment creation engine comprises a feature optimization unit executed by the processor and configured to automatically highlight the panels of the garment type template for users for embedding with the edited images subsequent to the editing of the images.

24. The system as claimed in claim 10, wherein the garment selection unit in communication with a feature optimization unit is configured to provide a drag and drop functionality on the UI for embedding the edited images into the panels of the garment type template.

25. The system as claimed in claim 10, wherein the garment selection unit in communication with a feature optimization unit is configured to provide an option on the UI to preview a created and designed garment type subsequent to the embedding of images in the panels, and wherein options are provided on the UI to the user to accept and proceed to next panel or reject and select another apparel or memory image and upload on the UI via the user device for embedding in the panel.

26. The system as claimed in claim 10, wherein the garment selection unit in communication with the feature optimization unit is configured to generate at least a 2D and a 3D representation of the designed garment type with the embedded apparel or memory image in the panel and render on the UI.

27. The system as claimed in claim 1, wherein the garment creation engine comprises an avatar generation unit executed by the processor and configured to generate an avatar of a user for displaying the designed garment type on the user via the UI from different sides of the user, as a virtual try-on technique, and wherein the avatar generation unit is configured to generate at least a graphical representation or a model of the designed garment type in avatar form on the UI and render via the user device.

28. The system as claimed in claim 27, wherein the avatar generation unit is configured to generate the one or more avatars for carrying out a virtual fashion show in which the user may display his or her designed garments via the avatars on the UI.

29. The system as claimed in claim 1, wherein the garment creation engine comprises a feedback unit executed by the processor and configured to enable the user to request a feedback and modifications from other users with respect to the created and designed garment type, and wherein the feedback is received by the feedback unit 130 in the form of at least voice messages and emails.

30. The system as claimed in claim 1, wherein the garment creation engine comprises an inventory management unit executed by the processor and configured to send a final designed garment for stitching and sewing to a garment stitching and sewing workshop, and wherein a layout of the designed garment is generated by the inventory management unit in the form of a report providing an indication with cross-reference between panels and fabric chosen for clear and concise placement during stitching and sewing.

31. The system as claimed in claim 1, wherein the garment creation engine comprises a repurposing unit executed by the processor and configured to render an option to the user via the UI for sending unused garments and apparels to the warehouse, where the unused garments and apparels are at least reused, repurposed into new garments, resold as second hand garments, repaired for extending life and recycled using mechanical, chemical and thermal processes.

32. The system as claimed in claim 30, wherein the inventory management unit is configured to manage three types of feeds comprising one or more real-time inventory feeds received via a network socket, one or more near real-time inventory feeds received via the network socket or an inventory provider Application Programming Interface (API) and a last updated time based API inventory call to inventory provider API for fetching one or more incremental inventory updates.

33. The system as claimed in claim 30, wherein the inventory management unit is configured to maintain the inventory data in an indexed format using an elastic search cluster technique, the inventory data is accessible via a material master API, and wherein the inventory management unit is configured to provide one or more options for regulating in-house material inventory feeds and the external material inventory feeds such as material API, Material Display Page (MDP), add to cart and express checkout for interacting with material master API in order to validate fulfilment of material requirements for garment stitching and sewing.

34. A method for generating an optimized online garment creation platform, wherein the method is implemented by a processor executing program instructions stored in a memory, the method comprises:
   rendering multiple fabric pieces data via a user interface (UI) on a user device;
   tagging the one or more fabric pieces data on the UI based on a circulatory score, wherein the circulatory score is indicative of environmental impact of the fabric pieces data;
   tagging a size of a garment type on the UI using the tagged fabric piece data for designing a garment via the UI;
   rendering one or more garment types in a template form on the UI, wherein the one or more garment type templates are tagged on the UI;
   splitting the tagged garment type template into a fixed number of one or more panels, wherein dimensions and layout of the panels vary based on the tagged garment type template;
   optimally embedding images in the one or more panels of the garment type template, wherein a pixel per distance metric of an edited region of the image is computed for determining size of the edited region of the image;
   adding the edited region of the image as a swatch in the garment type template, wherein the swatches which fits the edited region of the image for a specific angle of rotation of the edited region of the image are determined in the garment type template, and wherein the swatches are determined based on: initializing a convex polygon ('polygon A') with a midpoint of a concave polygon ('polygon B') as origin; computing every rotational angle of the convex polygon; computing multiple points corresponding to the convex polygon with rotational angle and subsequently placing all points of both the rotated convex polygon and concave polygon in a set of points that comprises both the convex and concave polygons having multiple vertex points; and performing a check to determine if the 'polygon C' and the 'polygon B' are having a same set of vertex points; and tagging the one or more panels of the garment type template for embedding with the one or more edited images.

35. The method as claimed in claim 34, wherein the fabric pieces data is associated with a metadata, the metadata comprises one or more parameters such as data related to the material of the fabric piece, reusability of the fabric piece, environmental impact of the fabric piece, recycling efficiency of the fabric piece and life extension of the fabric piece.

36. The method as claimed in claim 35, wherein the circulatory score is computed for each fabric piece metadata, and wherein the circulatory score is a cumulative circulatory score of the circulatory score computed separately for each of the parameters associated with the fabric piece metadata, the circulatory score is in a range of between 0-100 such that higher the circulatory score more environmentally suitable is the fabric piece.

37. The method as claimed in claim 34, wherein the garment type template is tagged for garment creation and designing on the UI based on a selection of design rendered via the UI.

38. The method as claimed in claim 37, wherein measurement of the garment type template is split into one or more components based on the size of the garment type tagged before rendering on the UI.

39. The method as claimed in claim 34, wherein the panels are selected at least on a front portion of the garment type template and on a back portion of the garment type template, and wherein size of the panels is at least increased and decreased based on user requirements, and wherein panel parameters information is determined comprising size, shape and placement of the panels based on the inputs received via the UI.

40. The method as claimed in claim 34, wherein the images relate to at least apparels and memories of the users, and wherein the images on the UI are uploaded by at least accessing an image library in the user device and from a social media website.

41. The method as claimed in claim 34, wherein one or more editing operations are automatically performed on one or more uploaded images comprising cropping and rotation of the images, and wherein an option is provided to the user for further editing the automatically edited images.

42. The method as claimed in claim 34, wherein the embedding of the edited images into the panels of the garment type template comprising fitting the edited image inside the panel of the garment type template for at least one angle or fitting the edited image inside the panel of the garment type template for all rotational angles.

43. The method as claimed in claim 34, wherein the user is instructed to place a reference object at least on the top left corner or left side of at least an apparel and memory image for effectively estimating the camera position and carrying out triangulation for capturing the at least apparel and memory image prior to uploading.

44. The method as claimed in claim 34, wherein computation of the pixel per distance metric comprises the steps of:
converting the captured apparel and memory image to a grayscale and smoothing the grayscale apparel and memory image using a Gaussian filter;
carrying out an edge detection operation of the captured apparel and memory image along with erosion and dilation operations to close gaps in edges in an edge map of the apparel and memory image;
determining one or more contours corresponding to the objects in the edge map, wherein the contours are determined based on applying at least canny edge detector technique, semantic segmentation technique, Hough transform technique and k-means segmentation technique;
sorting the contours from at least top left to bottom right of the captured apparel image;
computing a Euclidean distance for determining the contour of the reference object; and
computing the pixel per distance metric for the edited region of the image.

45. The method as claimed in claim 43, wherein a contour of the reference object is generated as a bounded rectangle shape, and wherein the contour of the reference object is generated by computing: midpoint of top left and top right corner of the bounded rectangle shape, midpoint of bottom left and bottom right corner of the bounded rectangle shape, midpoint of top left and bottom left corner of the bounded rectangle shape, and midpoint of top right and bottom right corner of the bounded rectangle shape.

46. The method as claimed in claim 34, wherein the swatches in the garment type template which fit the edited region of at least an apparel and a memory image are determined, the new convex polygon ('polygon C') is determined from the set of points using a graham scan technique executing a convex hull algorithm, and wherein if the 'polygon C' and the 'polygon B' are same having the same set of vertex points then it is determined that the 'polygon B' contains the 'polygon A' and the swatches in the garment type template fits the edited region of at least the apparel and memory image for a specific angle of rotation, and wherein if the 'polygon C' and the 'polygon B' are not same and does not have the same set of vertex points then it is determined that the 'polygon B' does not contain the 'polygon A' and the swatches in the garment type template does not fit the edited region of at least the apparel and memory image for a specific angle of rotation.

47. The method as claimed in claim 34, wherein an avatar of a user is generated for displaying the designed garment type on the user via the UI from different sides of the user, as a virtual try-on technique, and wherein at least a graphical representation or a model of the designed garment type in avatar form is generated on the UI and rendered via the user device.

48. The method as claimed in claim 34, wherein three types of feeds are managed comprising one or more real-time inventory feeds received via a network socket, one or more near real-time inventory feeds received via the network socket or an inventory provider Application Programming Interface (API) and a last updated time based API inventory call to inventory provider API for fetching one or more incremental inventory updates.

49. A computer program product comprising:
a non-transitory computer-readable medium having computer program code stored thereon, the computer-readable program code comprising instructions that, when executed by a processor, causes the processor to:

render multiple fabric pieces data via a user interface (UI) on a user device;

tag the one or more fabric pieces data on the UI based on a circulatory score, wherein the circulatory score is indicative of environmental impact of the fabric pieces data;

tag a size of a garment type on the UI using the tagged fabric piece data for designing a garment via the UI;

render one or more garment types in a template form on the UI, wherein the one or more garment type templates are tagged on the UI;

split the tagged garment type template into a fixed number of one or more panels, wherein dimensions and layout of the panels vary based on the tagged garment type template;

optimally embed images in the one or more panels of the garment type template, wherein a pixel per distance metric of an edited region of the image is computed for determining size of the edited region of the image;

add the edited region of the image as a swatch in the garment type template, wherein the swatches which fits the edited region of the image for a specific angle of rotation of the edited region of the image are determined in the garment type template, and wherein the swatches are determined based on: initializing a convex polygon ('polygon A') with a midpoint of a concave polygon ('polygon B') as origin; computing every rotational angle of the convex polygon; computing multiple points corresponding to the convex polygon with rotational angle and subsequently placing all points of both the rotated convex polygon and concave polygon om a set of points; determining a new convex polygon ('polygon C') from the set of points that comprises both the convex and concave polygons having multiple vertex points; and performing a check to determine if the 'polygon C' and the 'polygon B' are same having a same set of vertex points; and tag the one or more panels of the garment type template for embedding with the one or more edited images.

* * * * *